US010219155B2

(12) United States Patent
Anderson et al.

(10) Patent No.: US 10,219,155 B2
(45) Date of Patent: Feb. 26, 2019

(54) NETWORK MONITORING SYSTEM WITH REMOTE ACCESS

(71) Applicant: NETREO, Inc., Irvine, CA (US)

(72) Inventors: Andrew Mervin Anderson, Huntington Beach, CA (US); Kevin Patrick Kinsey, San Juan Capistrano, CA (US); James Matthew Mancini, Trabuco Canyon, CA (US)

(73) Assignee: NETREO, Inc., Irvine, CA (US)

( * ) Notice: Subject to any disclaimer, the term of this patent is extended or adjusted under 35 U.S.C. 154(b) by 116 days.

(21) Appl. No.: 14/999,629

(22) Filed: Jun. 6, 2016

(65) Prior Publication Data

US 2017/0353467 A1    Dec. 7, 2017

(51) Int. Cl.
*H04W 12/08* (2009.01)
*H04L 29/06* (2006.01)
*H04L 12/26* (2006.01)
*H04L 12/24* (2006.01)

(52) U.S. Cl.
CPC ......... *H04W 12/08* (2013.01); *H04L 43/0817* (2013.01); *H04L 43/10* (2013.01); *H04L 63/02* (2013.01); *H04L 63/1425* (2013.01); *H04L 41/14* (2013.01)

(58) Field of Classification Search
CPC .................................................. H04L 63/102

USPC ............................................................ 726/4
See application file for complete search history.

(56) References Cited

U.S. PATENT DOCUMENTS

2012/0084184 A1* 4/2012 Raleigh ............... H04L 12/5691
705/30
2012/0084438 A1* 4/2012 Raleigh ................. H04L 41/046
709/224

OTHER PUBLICATIONS

Macaulay, T, The 7 Deadly Threats to 4G, McAfee White Paper.
Atukuri, V., et.al., Network Evolution in 3G/4G: Applications and Security Issues, International Journal of Computer Science and Information Technologies, vol. 2 (6), 2011, 2835-2837.
3G and 4G Smartphone Security, REDCOM Laboratories, Inc., 2017.

* cited by examiner

*Primary Examiner* — Jacob Lipman
(74) *Attorney, Agent, or Firm* — Stanley H. Kremen

(57) ABSTRACT

Methods and apparatus for Network Monitoring System with Remote Access (10) are disclosed. A secured customer network (12) comprises computing resources that are connected together in an internal network (16). The secured customer network (12) is protected by a security perimeter (13) which prevents access by unauthorized devices outside the perimeter (13). This internal network (16) is connected to a secured customer network monitor 18, which is, in turn, connected to an intelligence engine (20) and to a security broker (22).

17 Claims, 30 Drawing Sheets

NETWORK MONITORING SYSTEM WITH REMOTE ACCESS

FIELD OF THE INVENTION

One embodiment of the present invention relates to a network and/or computer resources monitoring system. More particularly, one embodiment of the invention comprises a secure network and/or assembly of computer resources that includes a monitor and an intelligence engine. Users may access the secure network and/or assembly of computer resources through a security broker that manages a trusted connection to the user's mobile device, which runs a specially configured software App that enables the connection.

INTRODUCTION

The title of this Non-Provisional Patent Application is Network Monitoring System with Remote Access. The Applicants are:
  Andrew Mervin Anderson of 16365 Maruffa Circle, Huntington Beach, Calif. 92649;
  Kevin Patrick Kinsey of 8452 Calle Mira Monte, of San Juan Capistrano, Calif. 92675;
  James Matthew Mancini of 2 Windy Ridge Road, Trabuco Canyon, Calif. 92679.
All of the Applicants are Citizens of the United States of America.

CROSS-REFERENCE TO RELATED PENDING PATENT APPLICATIONS, CLAIMS FOR PRIORITY & INCORPORATION BY REFERENCE

None.

FEDERALLY SPONSORED RESEARCH OR DEVELOPMENT

None.

BACKGROUND OF THE INVENTION

Many large corporations, government agencies and other institutions operate extensive computer networks. These networks include a variety of hardware components, including computers, servers, blades and large scale memory devices. Current software is available to monitor the performance and operational status of these networks. To prevent fraud, hacking and unauthorized use, these networks are generally closed to access by unknown and untrusted devices that are located outside the confines of the networks.

The development of a system that enables remote access using mobile devices over trusted and secure links to these networks would be a major technological advance, and would satisfy long-felt needs in the software industry.

SUMMARY OF THE INVENTION

One embodiment of the present invention includes a secured customer network which includes computing resources that are connected together in an internal network. The secured customer network is protected by a security perimeter, which prevents access by unauthorized devices outside the perimeter. This internal network is connected to a secured customer network monitor, which is, in turn, connected to an intelligence engine.

The secured customer network is connected to a security broker, which, in this embodiment, is located outside the perimeter. The security broker is connected to an outside network that extends beyond the perimeter, which, in this embodiment, includes one or more transceivers in a wireless network. In one implementation of the invention, the wireless network may be a conventional cellular telephone system.

An appreciation of the other aims and objectives of the present invention, and a more complete and comprehensive understanding of this invention, may be obtained by studying the following description of a preferred embodiment, and by referring to the accompanying drawings.

A BRIEF DESCRIPTION OF THE DRAWINGS

FIG. 1 provides a view of one embodiment of the Network Monitoring System with Remote Access.

FIG. 2 provides a first flow chart that illustrates the operation of the network monitor.

FIG. 3 is a second flow chart of that depicts the operation of an intelligence engine.

FIG. 4 offers a third flow chart of that presents a view of the operation of the security broker.

FIG. 5 furnishes a first view of screenshots of a mobile App interface.

FIG. 6 furnishes a second view of screenshots of a mobile App interface.

FIG. 7 furnishes a third view of screenshots of a mobile App interface.

FIG. 8 furnishes a fourth view of screenshots of a mobile App interface.

FIG. 9 furnishes a fifth view of screenshots of a mobile App interface.

FIG. 10 furnishes a sixth view of screenshots of a mobile App interface.

Figure 14:
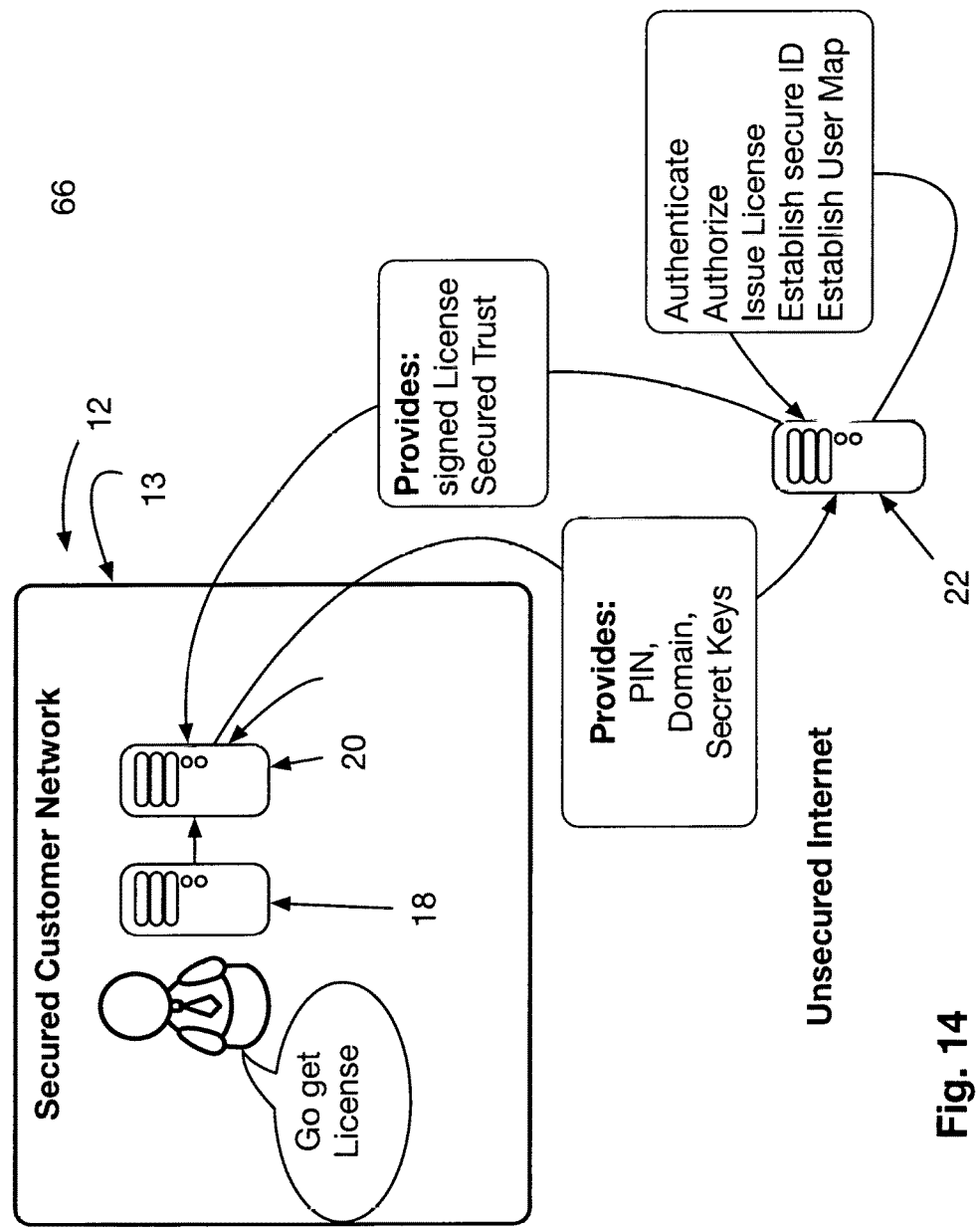

FIG. 14 offers a schematic view that shows how the intelligence engine establishes identity with a security broker.

Figure 15:
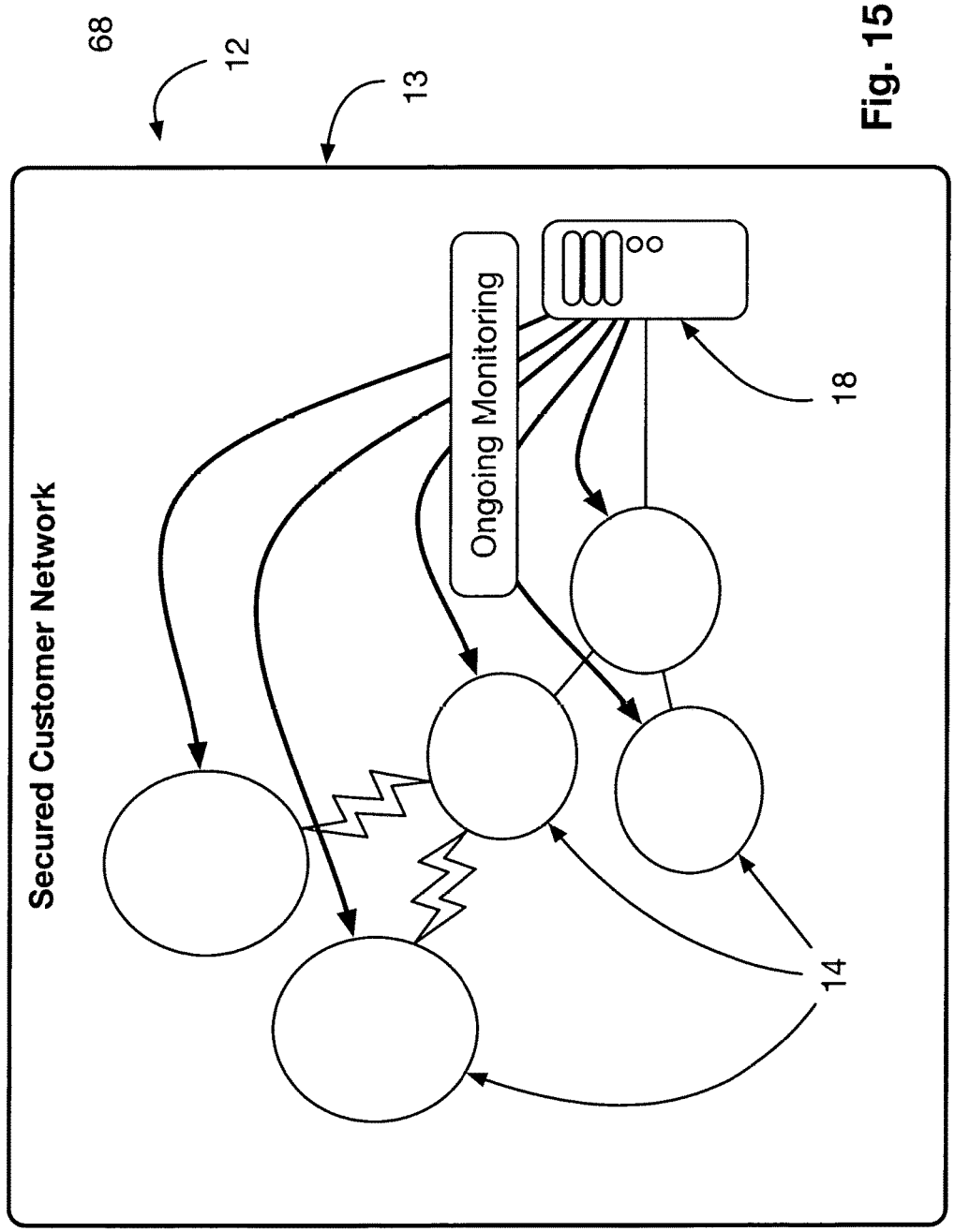

FIG. 15 shows how the network monitor monitors a secure customer network.

Figure 16:
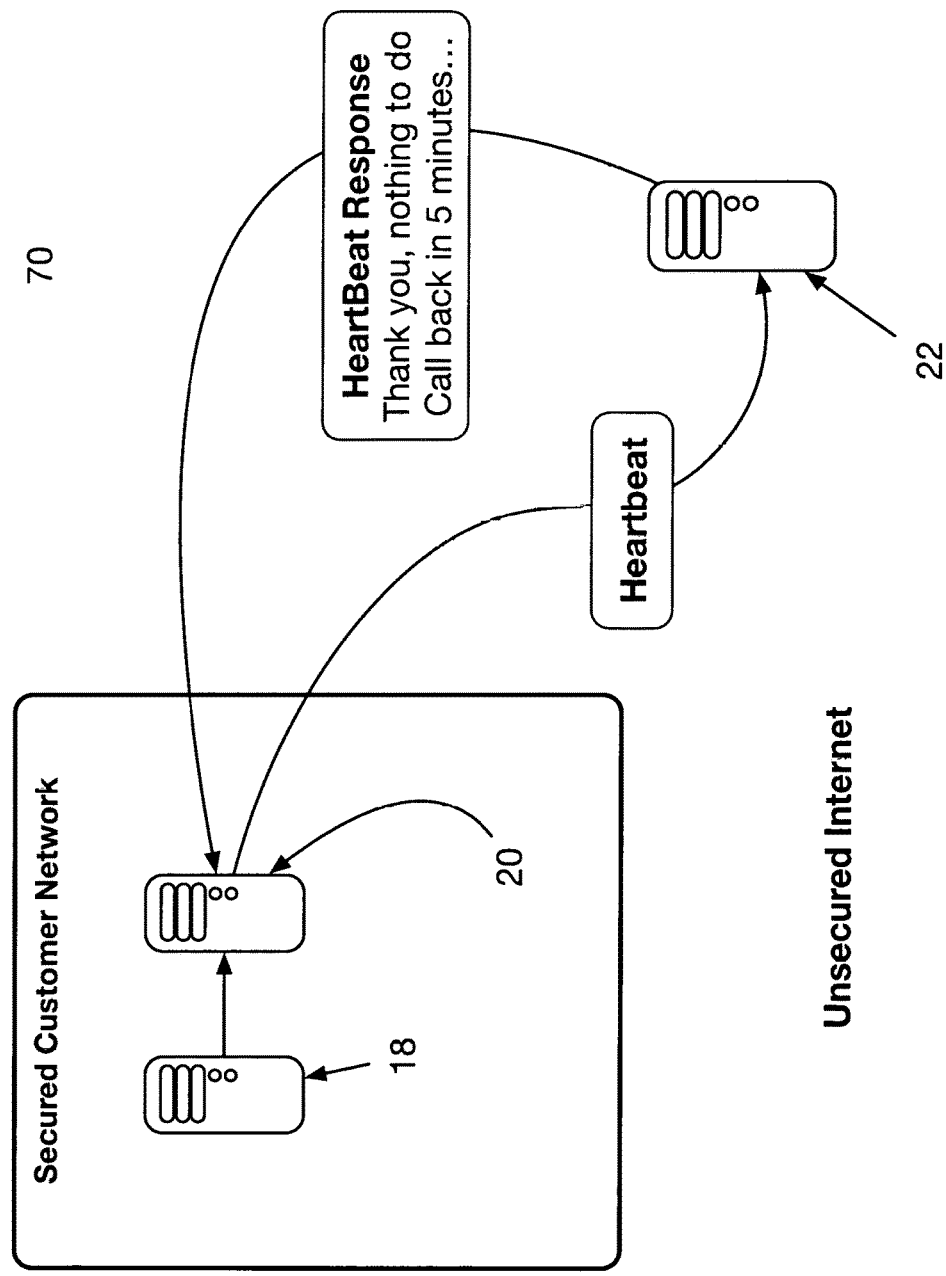

FIG. 16 supplies a view that depicts intelligence engine heartbeats.

Figure 17:
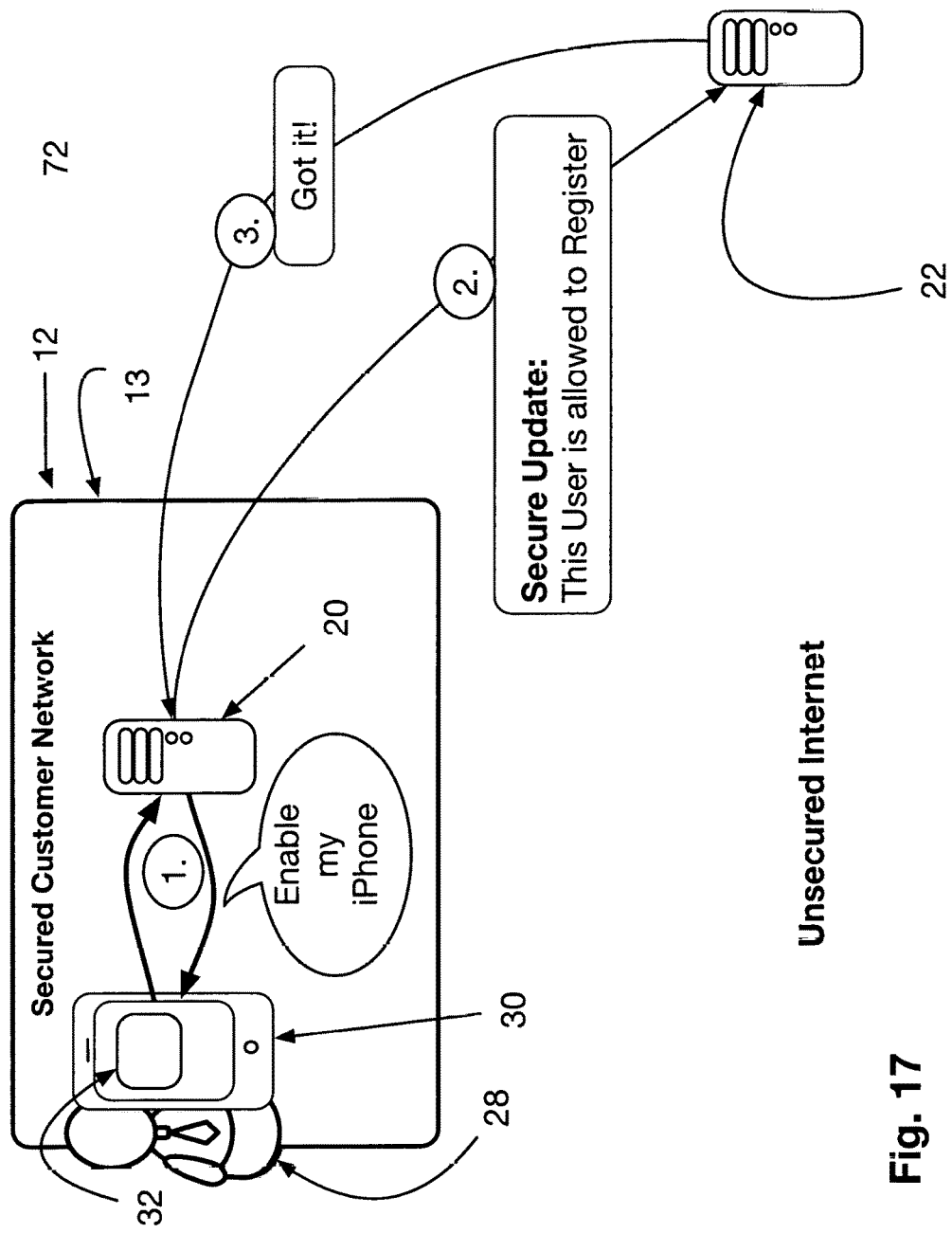

FIG. 17 is a depiction that reveals how a mobile device requests an access pairing with an intelligence engine.

Figure 18:
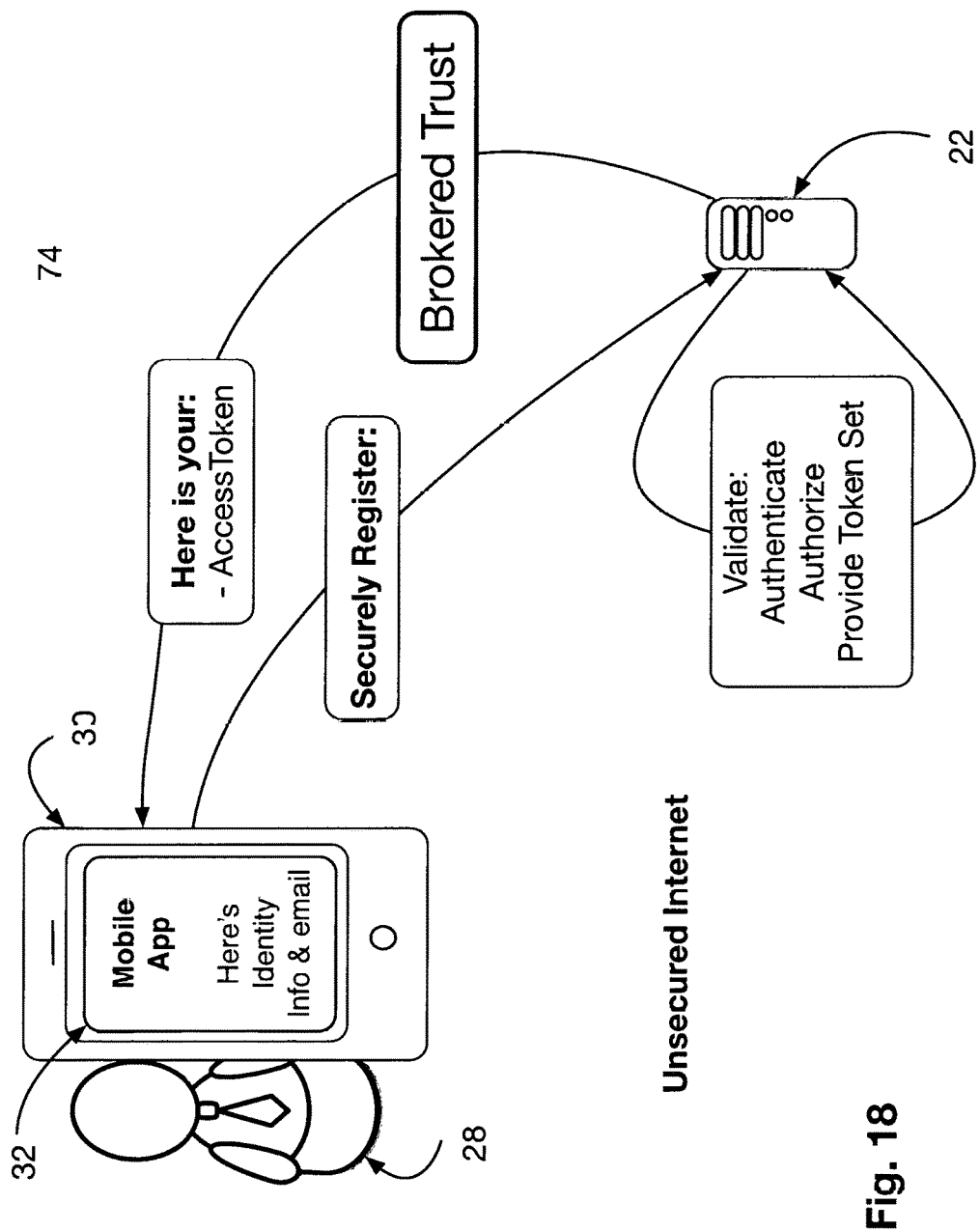

FIG. 18 shows how the mobile App registers with a security broker.

Figure 19:
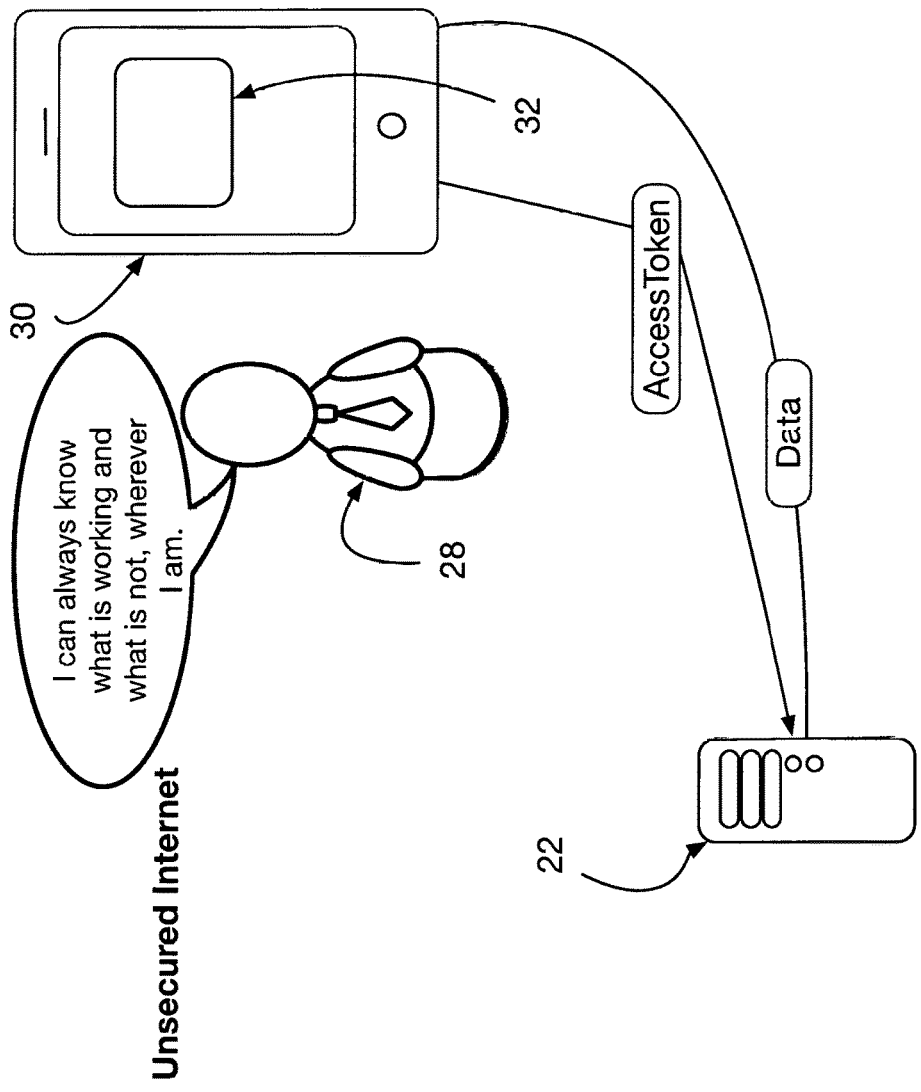

FIG. 19 portrays the method used by the mobile App to secure identity to insure a secure environment status.

Figure 20:
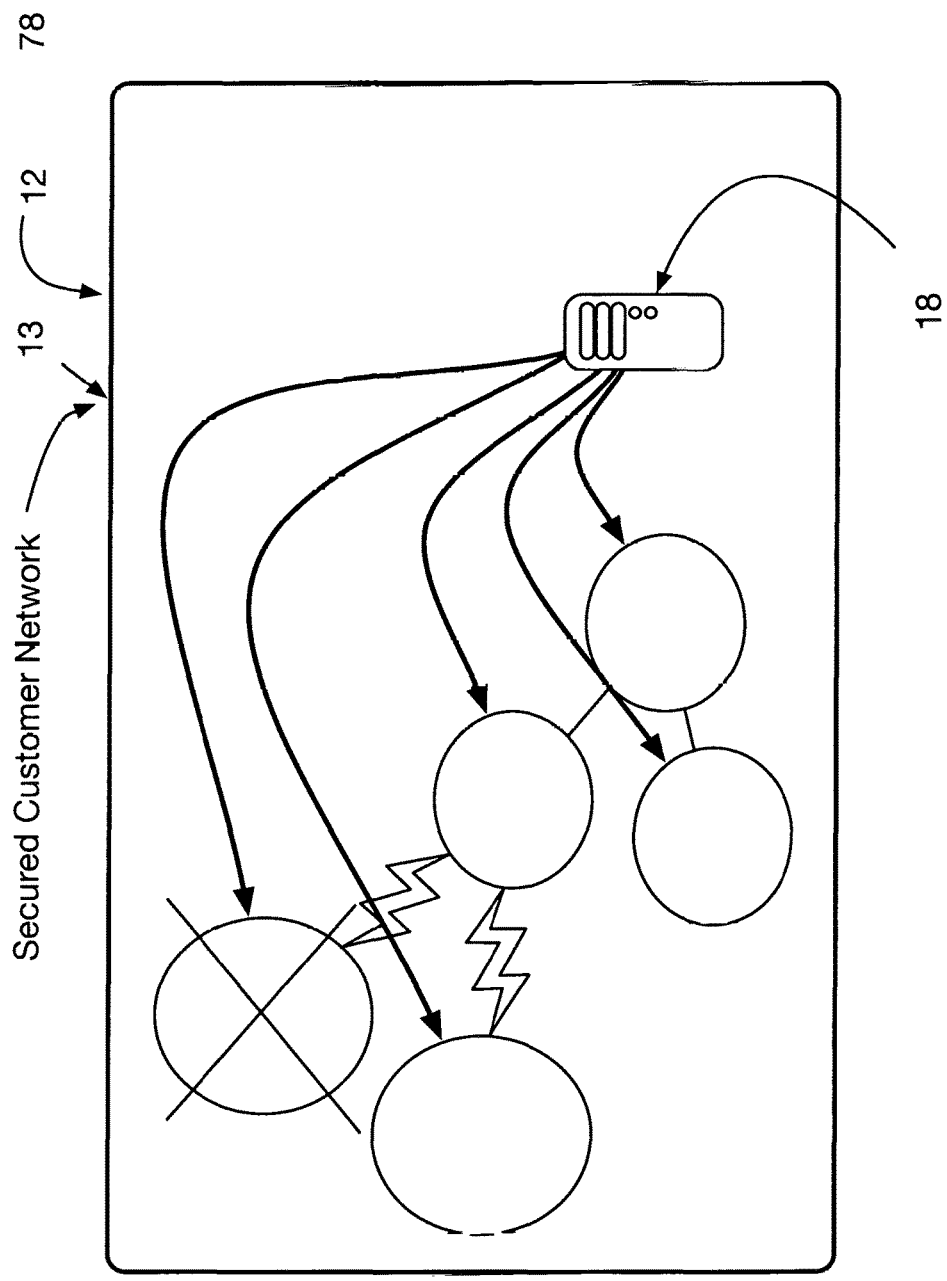

FIG. 20 is an illustration depicting the discovery of a problem by the network monitor.

Figure 21:
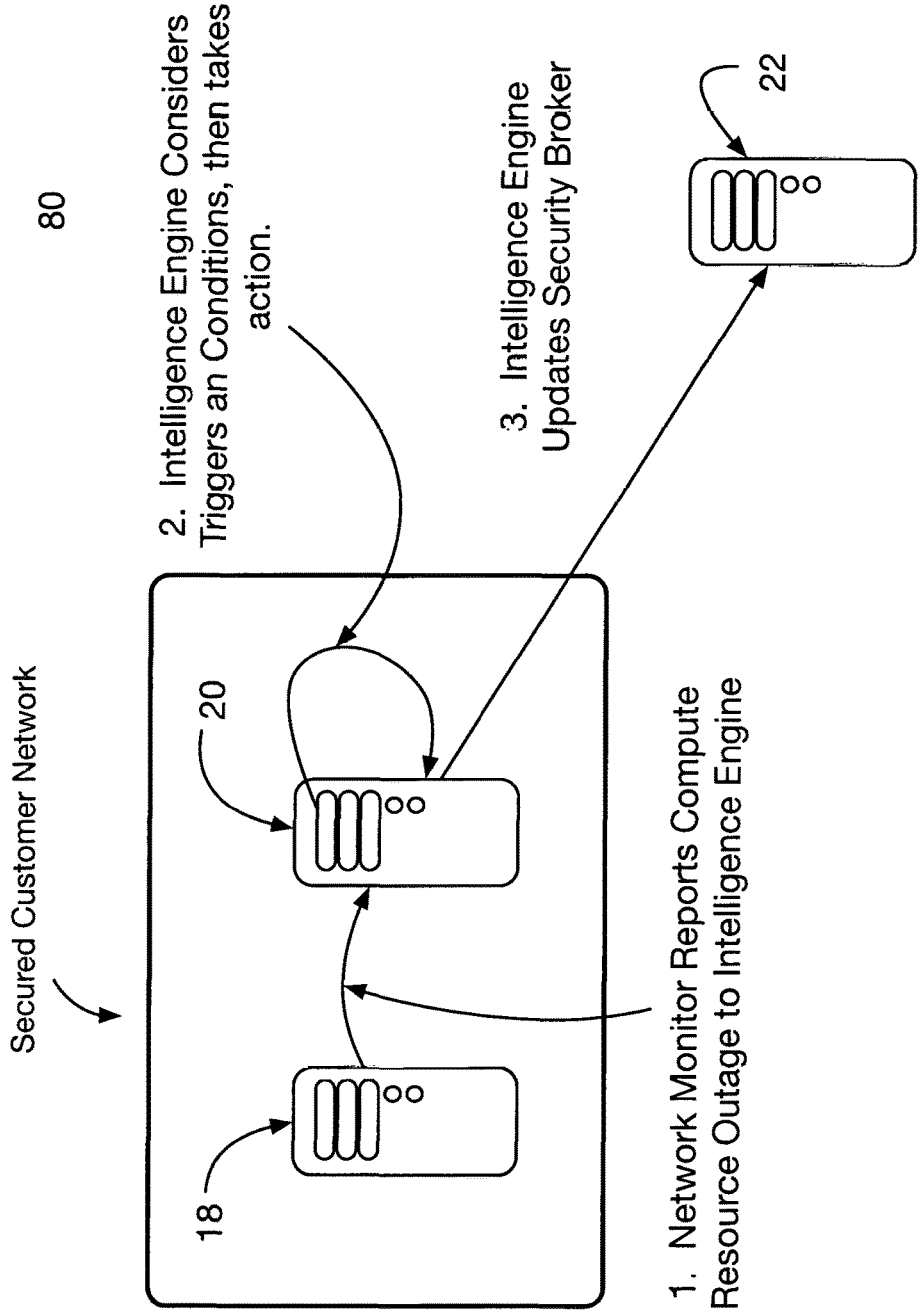

FIG. 21 offers a view of how the intelligence engine learns of a problem, and then updates then security broker.

Figure 22:
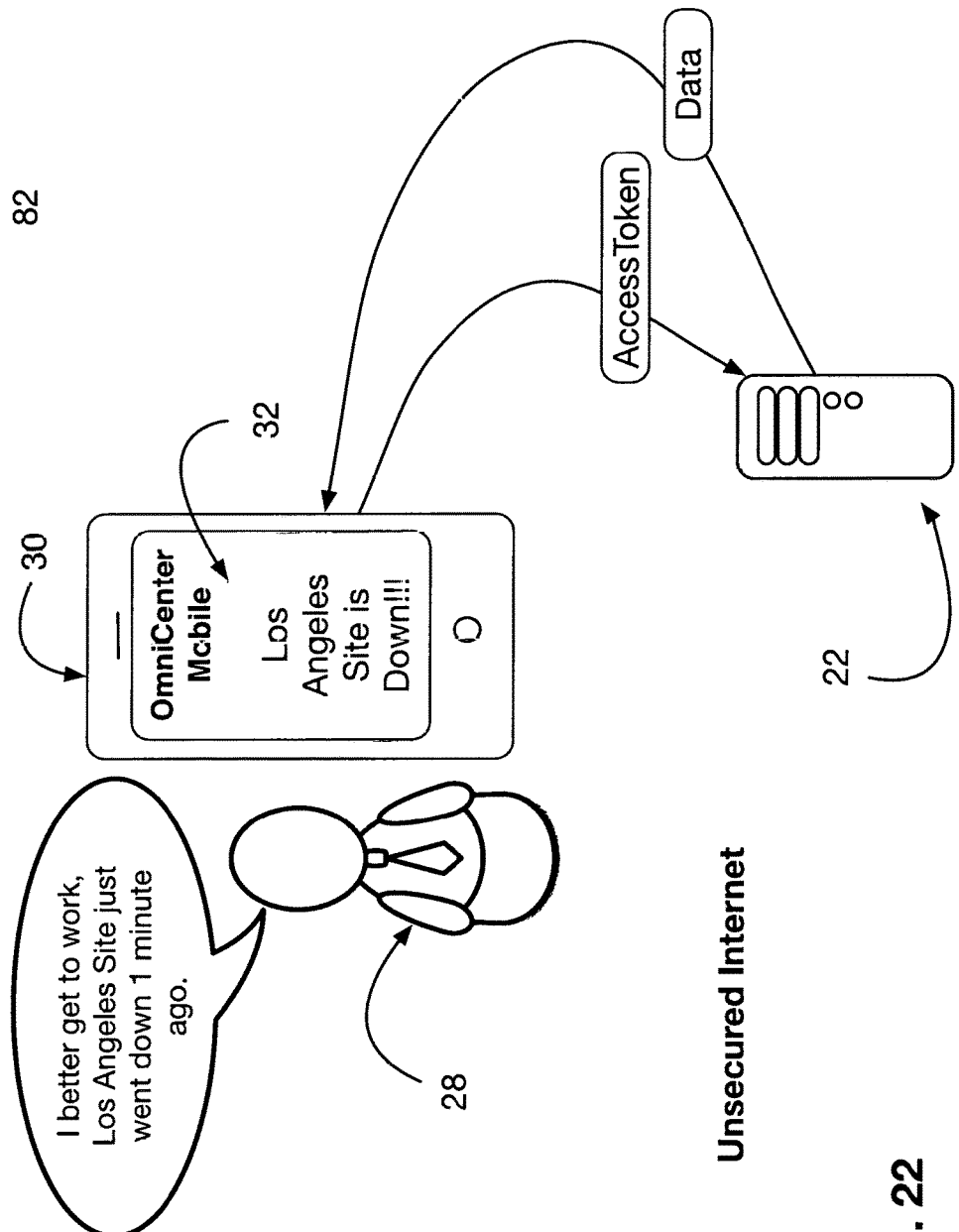

FIG. 22 shows how a mobile user learns about an outage.

Figure 23:
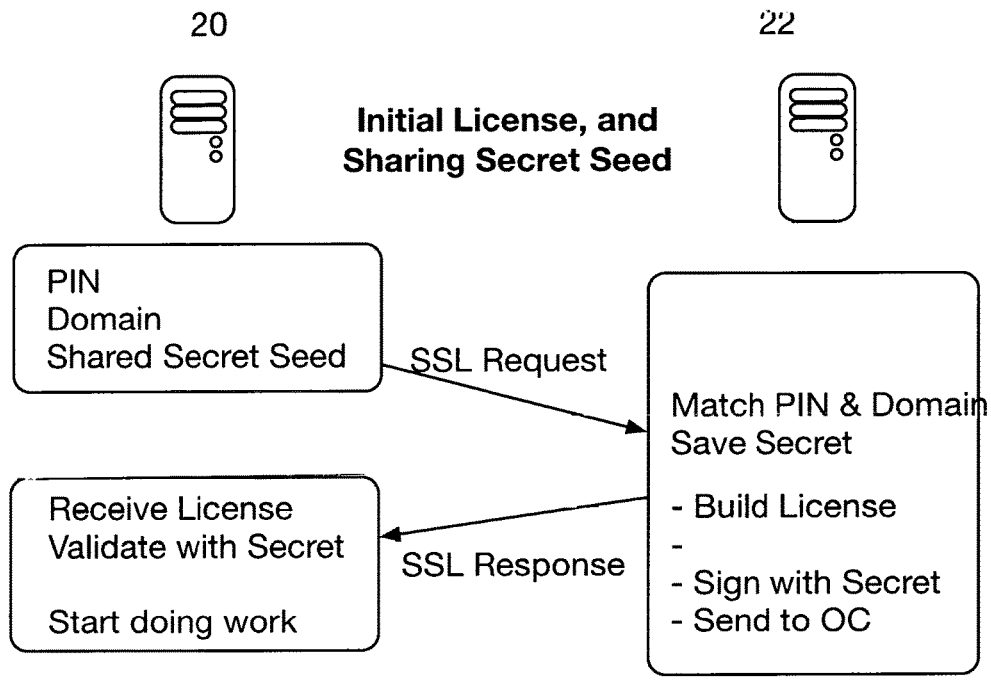
Figure 23:
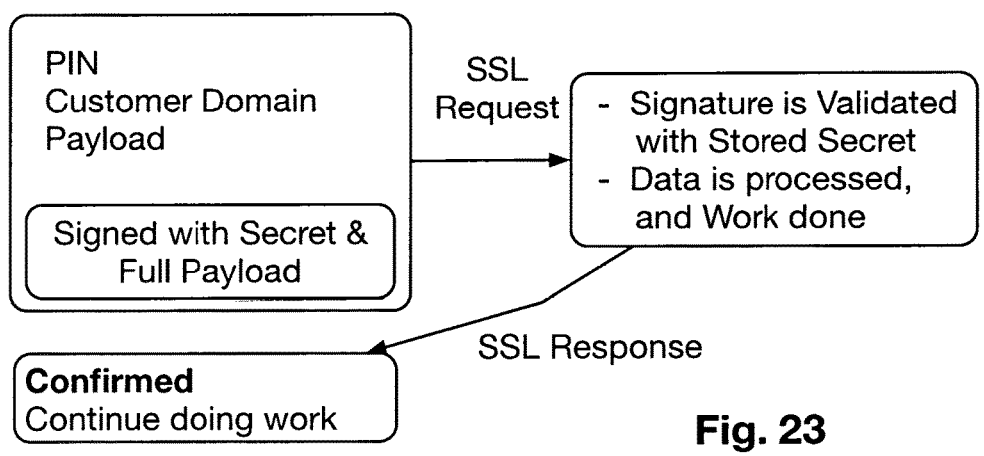

FIG. 23 reveals how the intelligence engine and the security broker share secrets.

Figure 24:
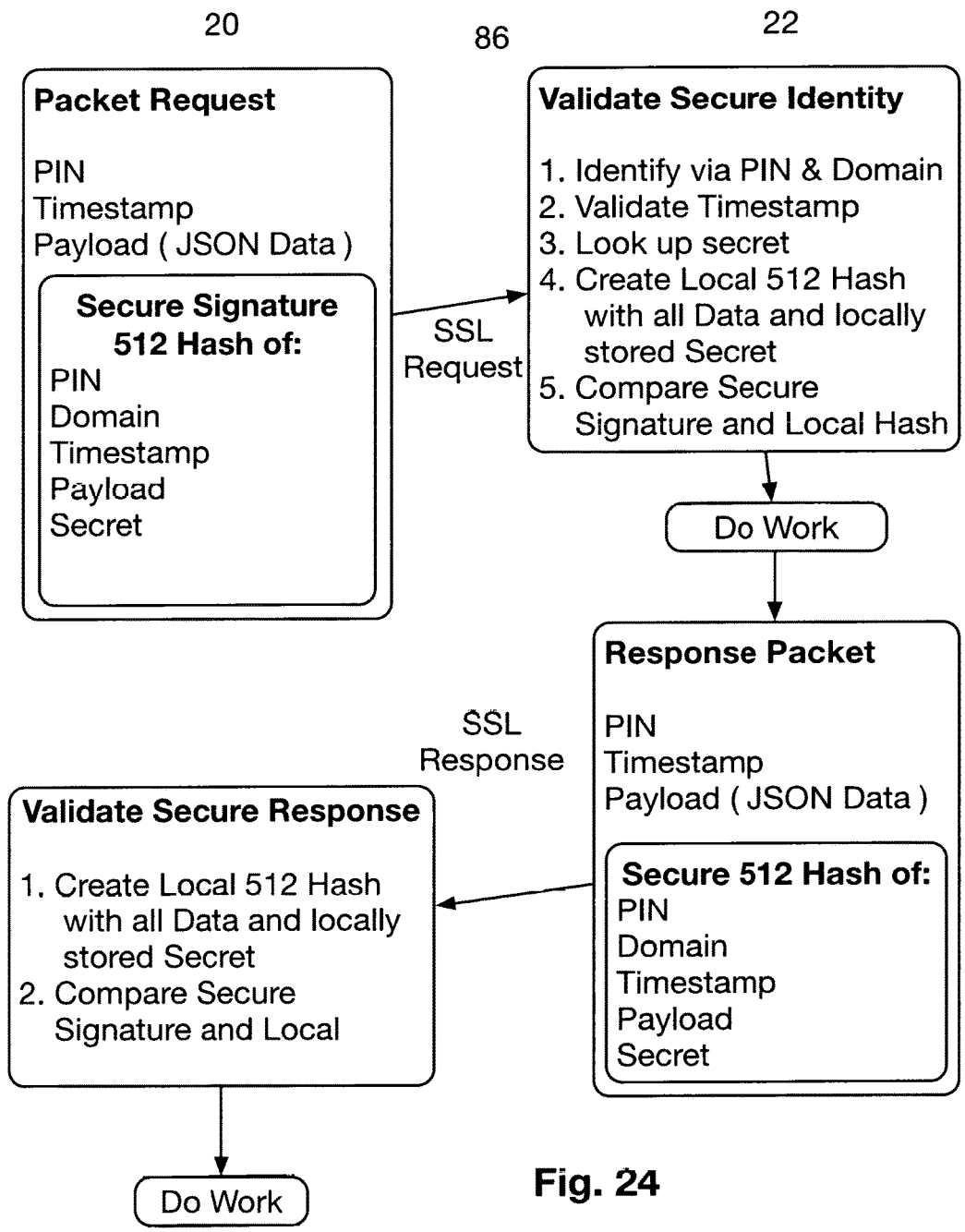

FIG. 24 is an illustration that portrays the intelligence engine and security broker packet format standard.

Figure 25:
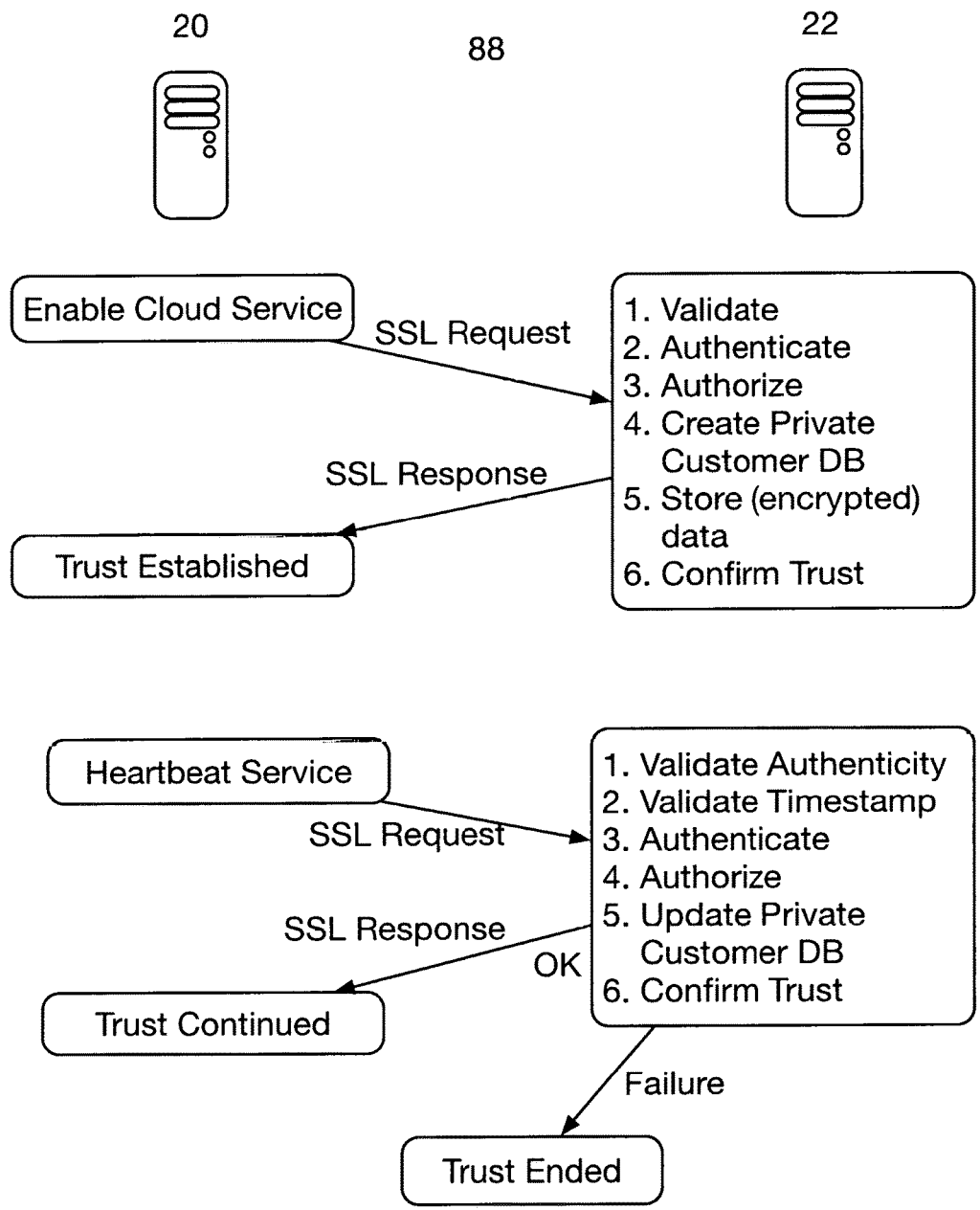

FIG. 25 provides a view that explains how the intelligence engine and the security broker establish and maintain trust.

Figure 26:
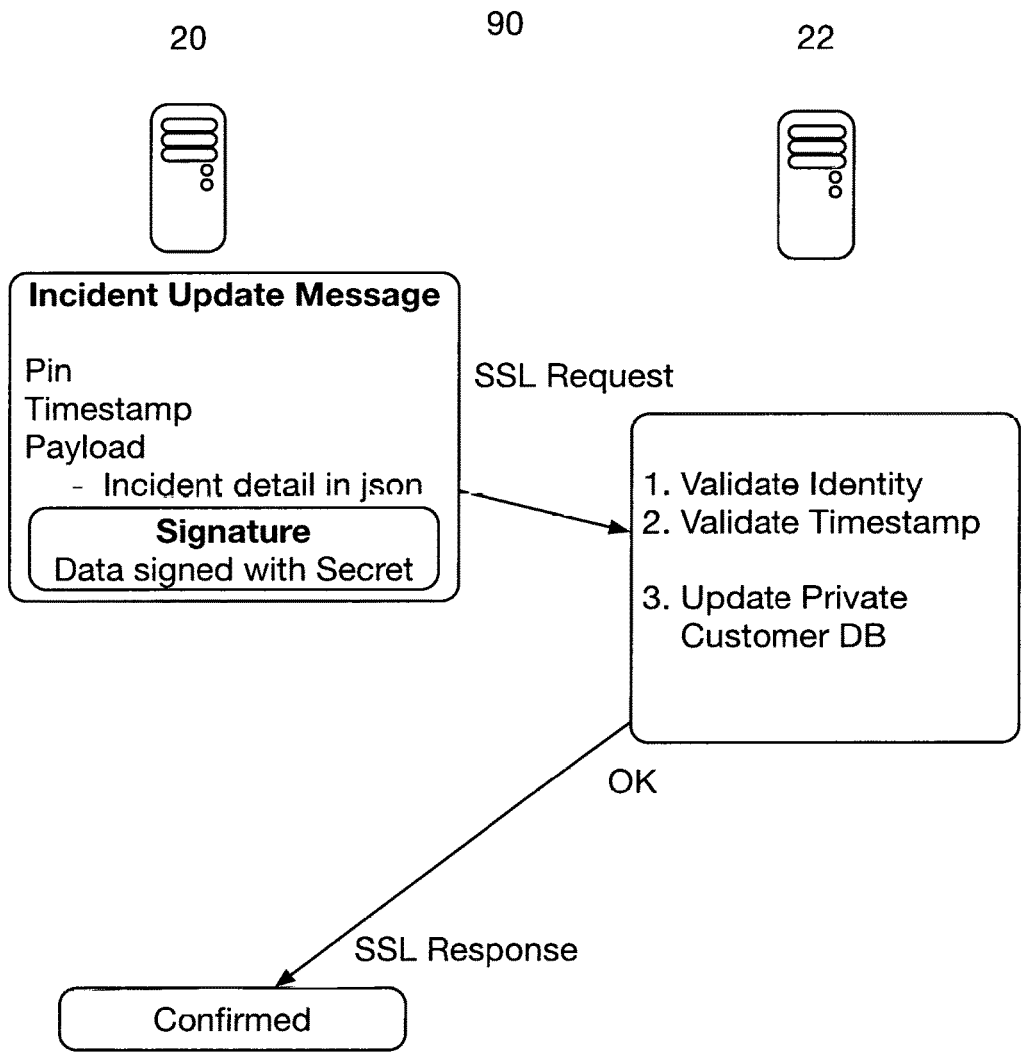

FIG. 26 offer a view of intelligence engine and security broker data updates.

Figure 27:
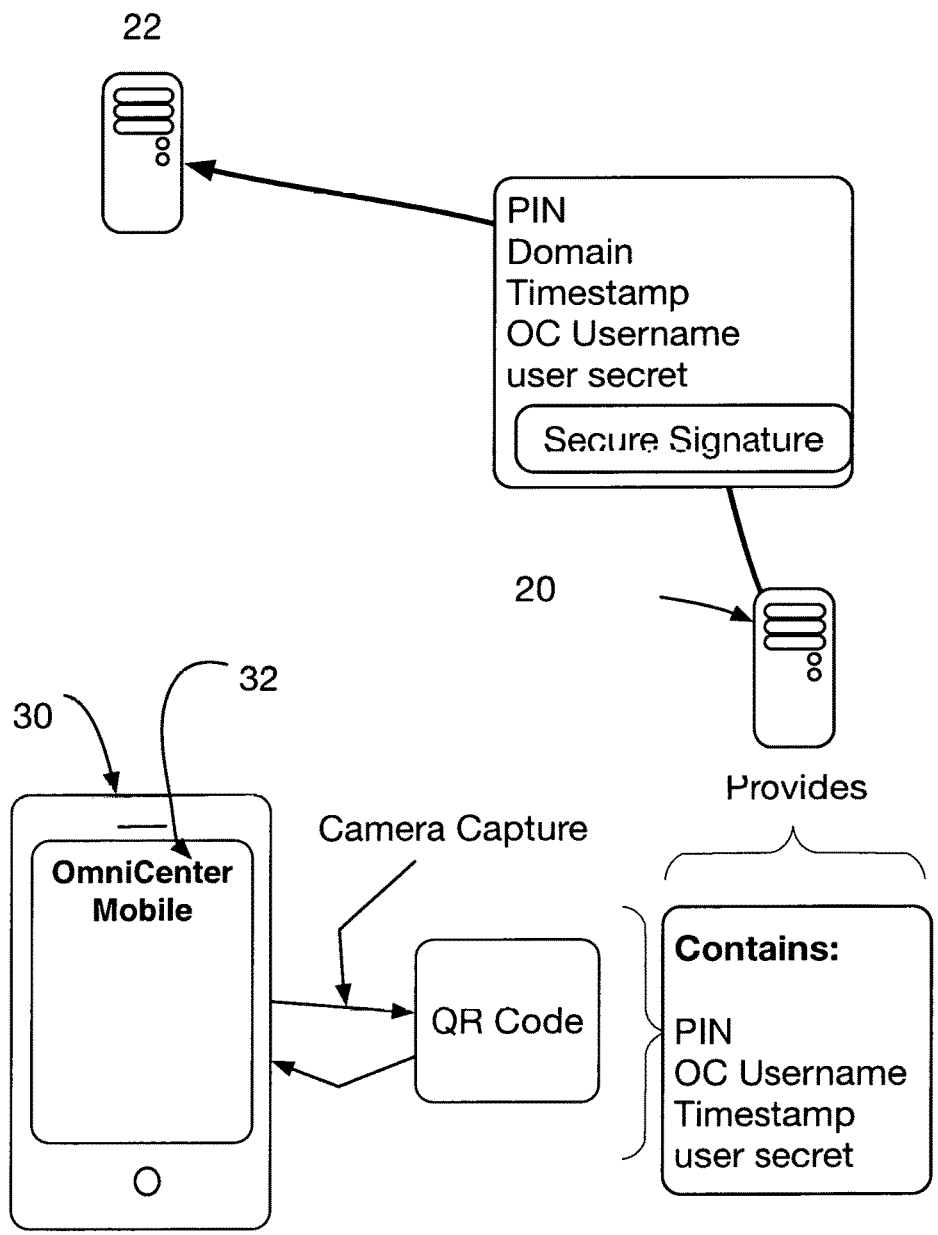

FIG. 27 shows how the mobile App registers with the intelligence engine.

Figure 28:
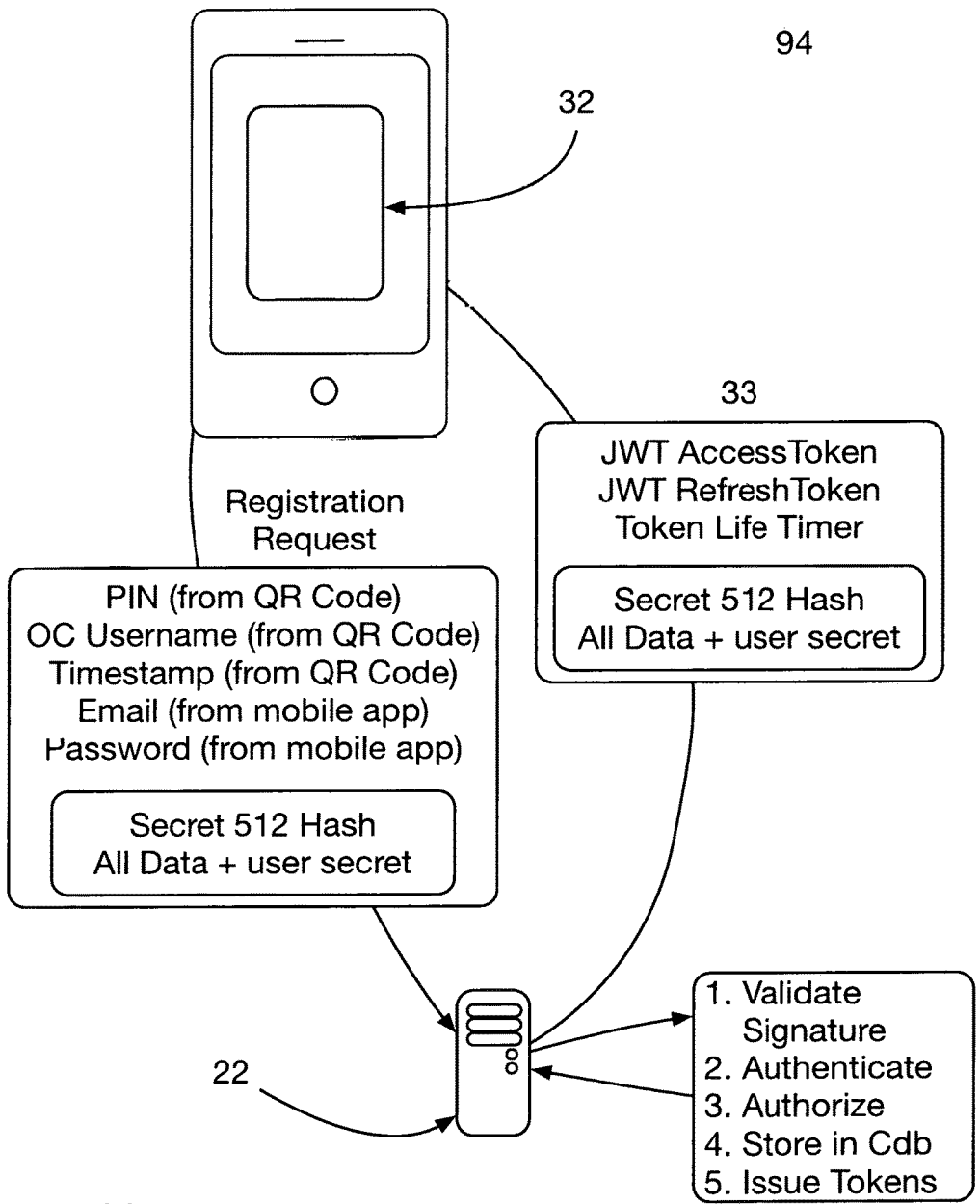

FIG. 28 is a view of how the mobile App registers with the security broker.

Figure 29:
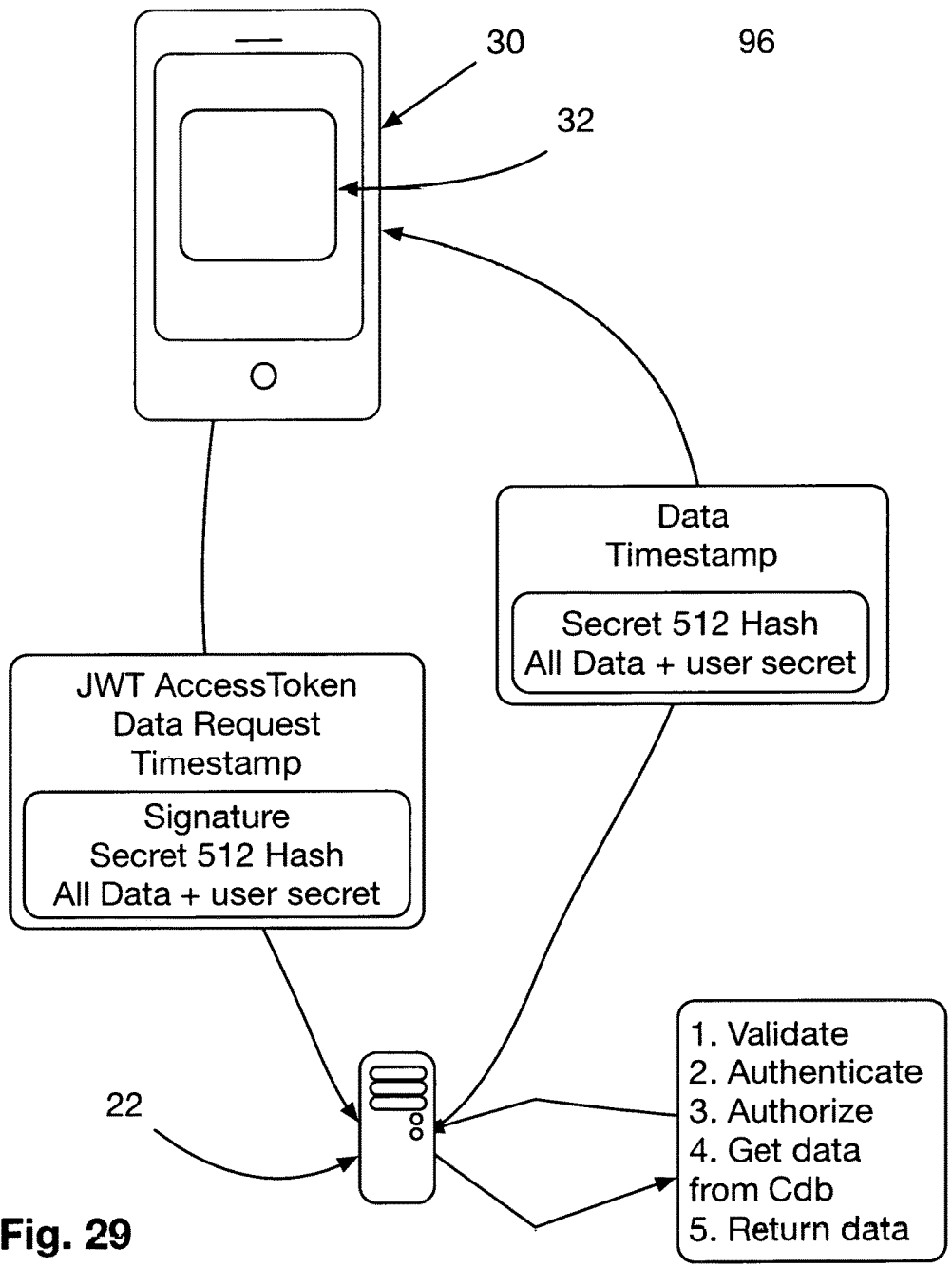

FIG. 29 depicts the mobile App receiving data updates.

Figure 30:
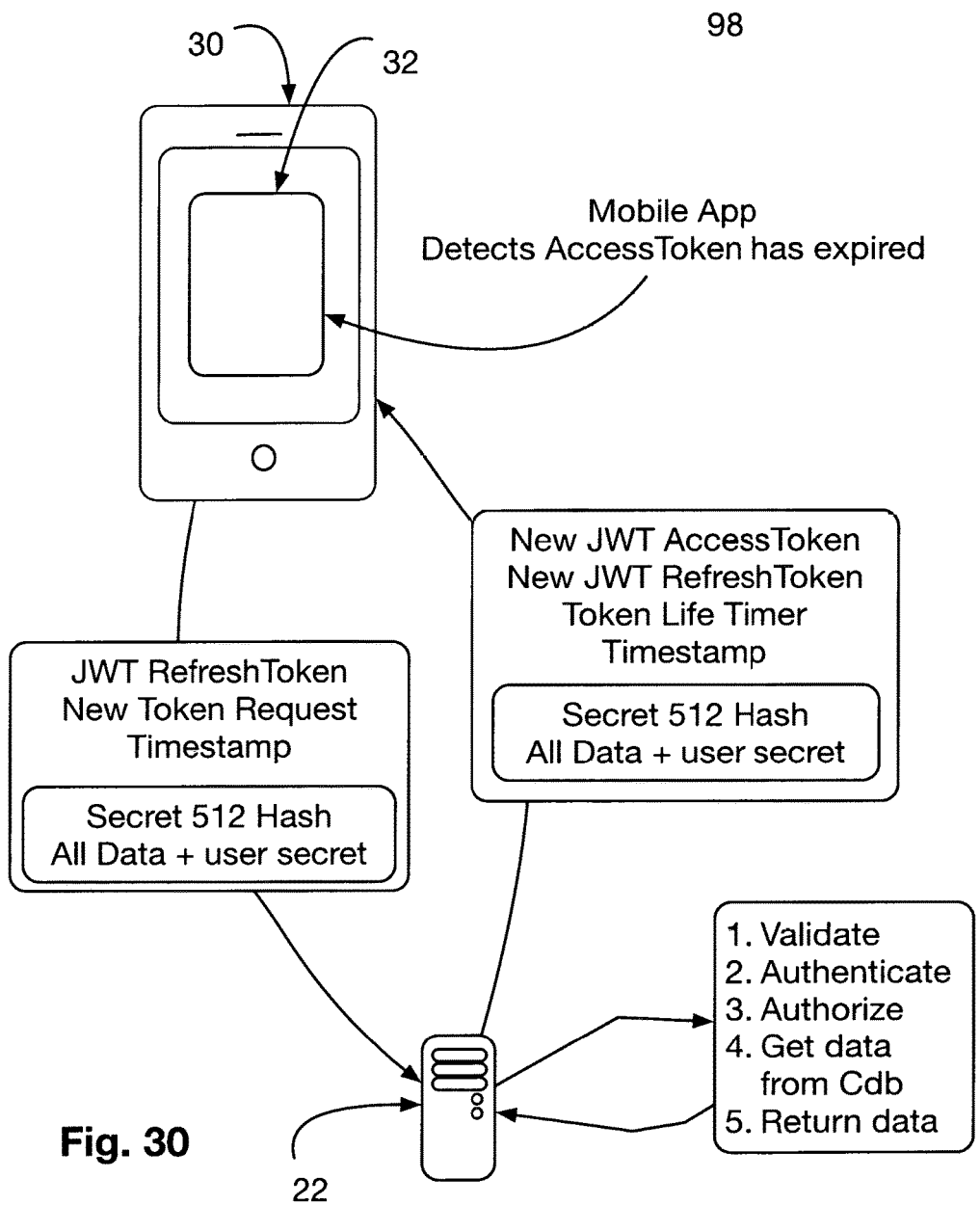

FIG. 30 is a view of a mobile App token exchange.

A DETAILED DESCRIPTION OF PREFERRED & ALTERNATIVE EMBODIMENTS

I. Overview of the Invention

Figure 1:
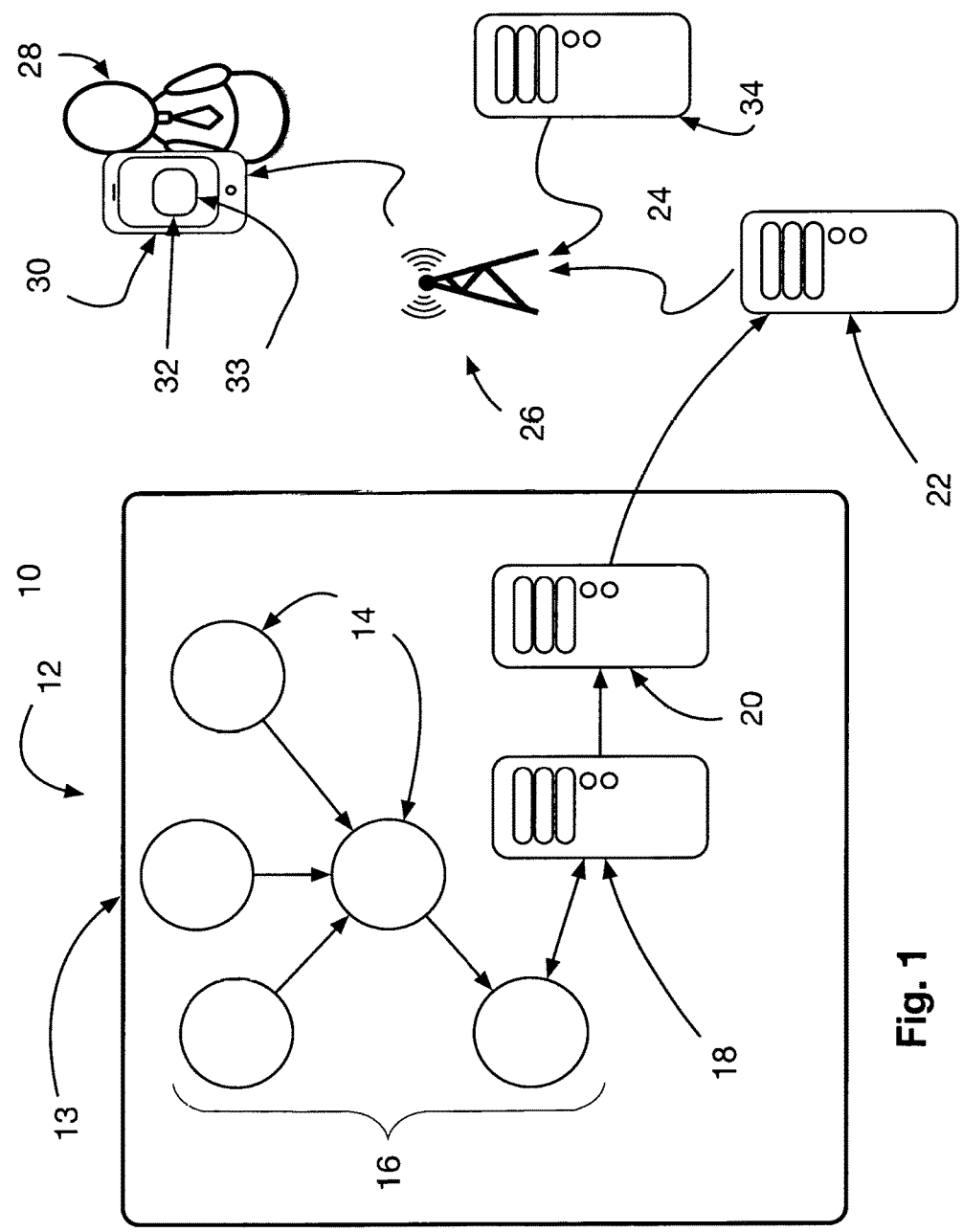

FIG. 1 provides a schematic view of one embodiment of the present invention, a Network Monitoring System with Remote Access 10. A secured customer network 12 includes various computing resources 14 that are connected in an internal network 16. The secured customer network 12 is protected by a security perimeter 13 which prevents access by unauthorized devices outside the perimeter 13. This internal network 16 is connected to a secured customer network monitor 18, which is, in turn, connected to an intelligence engine 20.

The secured customer network 12 is connected to a security broker 22, which, in this embodiment, is located outside the perimeter 13. The security broker 22 is connected to an outside network 24 that extends beyond the perimeter 13, which, in this embodiment, includes one or more transceivers in a wireless network 26. In one implementation of the invention, the wireless network 26 may be a conventional cellular telephone system.

A user 28 equipped with a mobile device 30 is able to access the secured customer network 12 under very special limited and strictly controlled circumstances. The mobile device 30 runs a specially designed and customized App 32 that is associated with a secure identity 33 which is generally downloaded from an App server 34 through the wireless network 24, 26. The mobile device 30 runs a specially designed and customized App 32 that is generally downloaded from an App server 34 through the wireless network 24, 26 and is associated with a secure identity 33.

In this Specification and in the Claims that follow, the "user" 28 may be an individual, or some combination of automated hardware and/or software. The term "App" 32 is intended to encompass any specialized combination of hardware and/or software that works with the mobile device 30 to provide a secure and trusted link between the user 28 and the secured customer network 12. A "mobile device" 30 is generally any combination of hardware and/or software that enables a user 28 to connect to a network 24, 26 and to the secure customer network 12 based on a trusted secure identity 33.

In one embodiment of the invention, the secured customer network monitor 18 generally continually obtains information about the computing resources 14 within the security perimeter 13 of the secure customer network 13. The intelligence engine 20, which is connected to the secure customer network monitor 18 analyzes the data obtained from the computing resources 14 connected to the monitor 18. The intelligence engine 20 produces a report concerning the operating state of the computing resources 14.

One or more users 28 located outside the security perimeter 13 of the secured customer network 12 is granted access to the intelligence engine 20 so that users 28 may obtain the report on their mobile devices 30. Users 28 employ a specially composed software App 32 that has been downloaded to their mobile device 30, and which is particularly designed to access the intelligence engine 20 inside the security perimeter 13 after a secure identity 33 is assigned to the user's mobile device 30.

Users are granted their first access to the secured customer network 12 while their mobile devices 30 are located within the secured customer network 12. Users are granted subsequent access to the intelligence engine 20 through the security broker 22 after their mobile devices 30 are no longer located within the secured customer network 12 based on the secure identity 33 which was originally assigned to their mobile device 30.

One or more security brokers 22 are accessible to both the secure customer network 12 and to the users 28. The security brokers 22 insure that only qualified users 28 have access to the intelligence engine 20.

II. Operation of One Embodiment of the Invention

In one implementation of the invention, a secure customer network monitor 18 is installed within a secured customer network 12. The secure customer network monitor 18 collects data on all computing resources 14 within the secured customer network 12 to obtain data concerning performance, traffic and availability visibility.

The secure customer network monitor 18 is connected to an intelligence engine 20 that analyzes the data collected by the secure customer network monitor 18. The intelligence engine 20 produces specific actionable incidents that describe environment issues, and all the computing resources 14 that they are affecting.

A user 28 communicates with the intelligence engine 20 through a security broker 22 via a mobile device 30 over a secured and trusted connection that is protected by a secure identification with shared secret keys. The user may obtain a list of unavailable services provided by the secured customer network 12. The information that is provided to the user on his or her mobile device 30 is discrete, secure and encrypted. The secure connection to the user provides data updates, secure network monitor status and intelligence engine status.

Once a secure relationship is established between the user 28 and the security broker 22, the intelligence engine 20 sends constant heartbeats to guarantee the security broker 22 has up to date status of the secure customer network 12, and generally continually confirms the ongoing security and trust of the connection to the user 28. A heartbeat is a periodic signal that confirms the security of a connection.

A software App 32 that runs on the user's mobile smartphone 30 provides user visibility into all of the currently open and important issues within the secure customer network 12 from a user located in an insecure network without any other environmental changes.

The user's mobile device 30 can communicate back to the intelligence engine 20 by passing requests to the security broker 22. The security broker 22 uses the next heartbeat reply to complete the communication back to the intelligence engine 20.

The Secured Customer Network Monitor

In one implementation of the invention, the secured customer network monitor 18 is installed within the security perimeter 13 of the secured customer network 12. The secured customer network monitor 18 interrogates some or all of the computing resources 14 on a generally ongoing basis.

The interrogation of the computing resources 14 is done via regular ICMP Pings as defined in the IEEE RFC 792 Protocol to measure response and reachability. Additional performance statistics are collected from the computing devices 14 using the SNMP management protocol as defined in IEEE RFC 1157, and the WMI protocol as provided by Microsoft$^{SM}$. This protocol is commercially bundled in all Microsoft$^{SM}$ software.

The secured customer network monitor 18 collects the responses of all of these data probes from the computing resources 14 within the secured customer network 12. If any of them have negative responses, the secured customer network monitor 18 notifies the intelligence engine 20.

For any of the statistics collected, the secured customer network monitor 18 records the statistics in a database, and periodically checks the average of the statistics in the database to see if any values exceed pre-defined thresholds over time. If they do, then the secured customer network monitor 18 reports the threshold anomalies to the intelligence engine 20.

The secured customer network monitor 18 then tracks the state of these outages and anomalies, and, if they recover by either starting to offer a positive response, or by the statistic changing its value to below the pre-defined threshold, the secured customer network monitor 18 reports the recovery to the intelligence engine 20.

The Intelligence Engine

In one embodiment, the intelligence engine 20 receives alarms from the secured customer network monitor 18 specific to failures or performance issues and any given computing resource 14 in the secure customer network 12. The intelligence engine 20 processes inputs from the secured customer network monitor 18, and then organizes, co-relates, and initiates appropriate actions. Any action that is being taken on an incoming alarm creates an open incident. Open incidents are alarm containers that the intelligence engine 20 has deemed as being actionable (and has taken action on), but which are not yet remedied.

The intelligence engine 20 provides three levels of logic that implement its tasks. The first level is its trigger logic. The trigger logic provides a decision tree to consider all incoming alarms, and to compare their specific attributes to the rules laid out in the decision tree. The standard library of attributes to be considered are: name, network addresses, type of device, physical location, topographical location, related applications, categories, as well as specific arbitrary user configured attributes.

The primary role of the trigger tree is to decide if the incoming alarm is to:
  create a new open incident and take action;
  be considered in the condition tree for relation to an open incident and to other alarms; and
  pass on the alarm and consider other triggers for further processing.

The second level is the condition tree. The condition tree logic considers all of the attributes of the incoming alarm against a list of other alarms that have already been established as actionable. It is a comparison of the same library of attributes the incoming alarm has defined in its trigger against the alarms in open incidents.

Specific rules are configured in the condition tree to match these incoming alarm attributes with open incident attributes, and then:
  co-related the alarm with an open incident (and take no further action); and
  pass on the alarm and consider other triggers for further processing.

The third level is the action engine. When passed to the action engine, an open incident is created indexed by an incident ID. The actions then include:

send an alert to users 28 via email, pager, or other notification service;
execute upstream web-hook API's to act further on the engine's behalf; and
instruct the secured customer network monitor 18 device to 10 execute a program to try and remedy the situation.

The engine provides reports that list all open incidents, and for any given open incident can provide a report showing everything describing that incident including all co-related alarms, and all actions that have been taken.

The Security Broker

In one implementation of the invention, the primary role of the security broker 22 is to manage and to provide secure identities for:
  one or more intelligence engines 20;
  one or more mobile devices 30,
  the mobile device App 32,
  one or more users 28.

The security broker 22 acts as a data broker for each of those identities to share data among each other based on the privileges learned from the intelligence engine 22 and stored in identity maps.

A secured identity 33 is always paired with a shared secret key that the identity 33 can be signed with on both sides. This is a private key that must not be shared or communicated after its initial pairing, but is always used to sign all communication.

The intelligence engine 20 updates the security broker 22, by first revealing his secure identity, and then providing all the data required for the reports from the intelligence engine 20 to report. The security broker 22 encrypts and securely stores this data.

The intelligence engine 20 sends a heartbeat message to the security broker 22 every five minutes identifying himself. The security broker 22 will take this heartbeat to mean that the intelligence engine 20 is healthy, and that its data is up to date. If the security broker 22 does not receive a heartbeat from the intelligence engine 20 within a ten minute interval, the security broker 22 assumes that the data that has been received is stale. The security broker 22 then reports that the intelligence engine 20 has failed to any mobile devices 30 that have secured identities registered and mapped to it, and invalidates all stored data.

When a user 28 logs into his mobile App 32 on their mobile device 30, the App 32 will use any public network to securely transmit and receive data to and from the security broker 22. The security broker 22 will take the user identity, the mobile device identity, and the App identity to look up in its user map, and get the mapping to the intelligence engine 20 for data which the identities are permitted.

The security broker 22 then uses the public network to securely transmit the current open incident status data to the mobile App 32. The mobile App 32 uses this data to provide the reporting interface current status of the secured customer environment via the open incidents.

III. Specific Functions of Elements of the Invention

One embodiment of the invention includes a secure customer network monitor 18, one or more intelligence engines 20 and a security broker 22.

Figure 2:
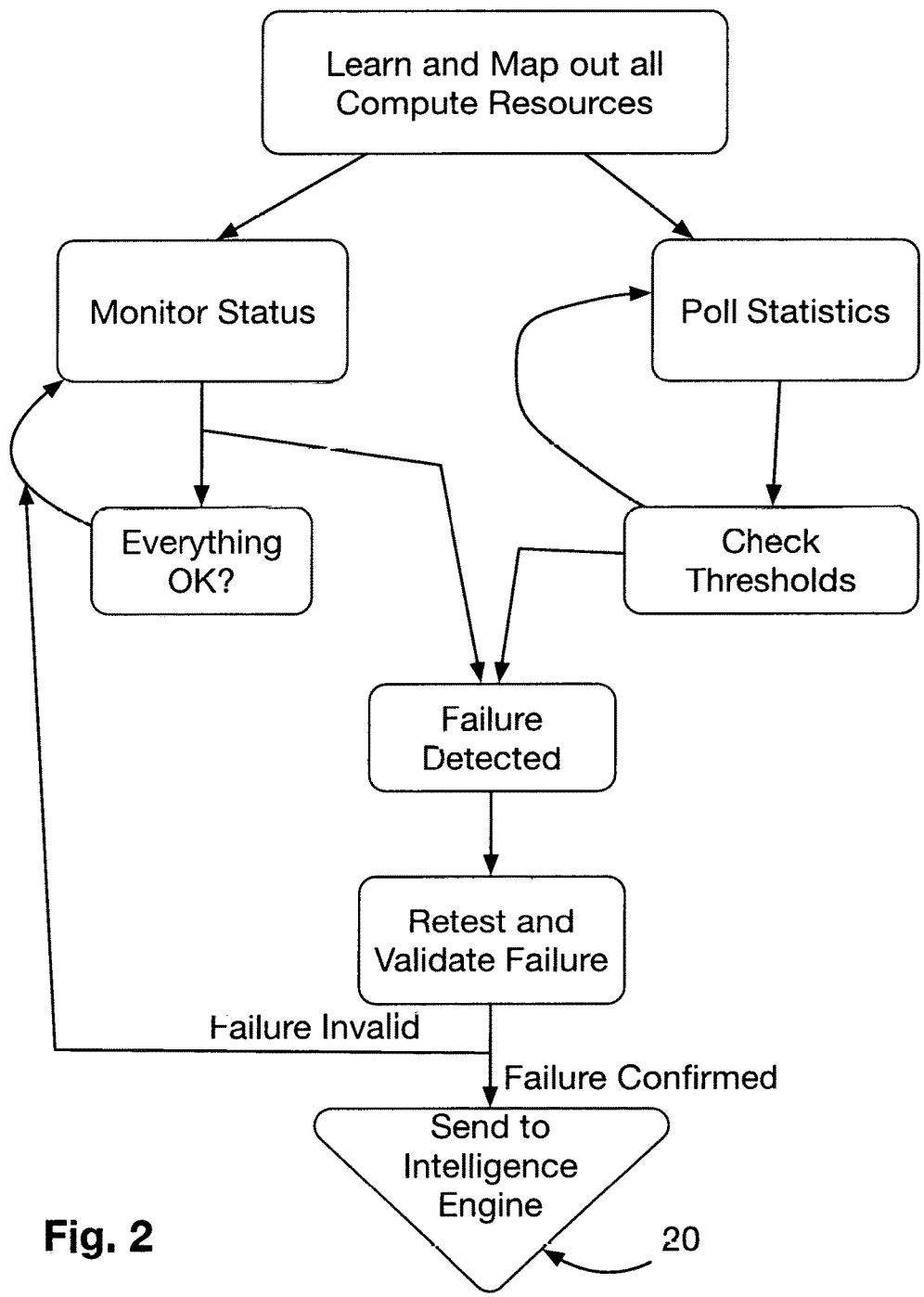

FIG. 2 provides a first flow chart that illustrates the operation of the network monitor 18. The first task for the monitor 18 is to learn and map out all the computing resources 14. After this first task is accomplished, the status of the resources is monitored, and poll statistics are generated. If a failure is detected, the monitor tests again and validates the failure. If the failure is confirmed, the intelligence engine 20 is notified.

Figure 3:
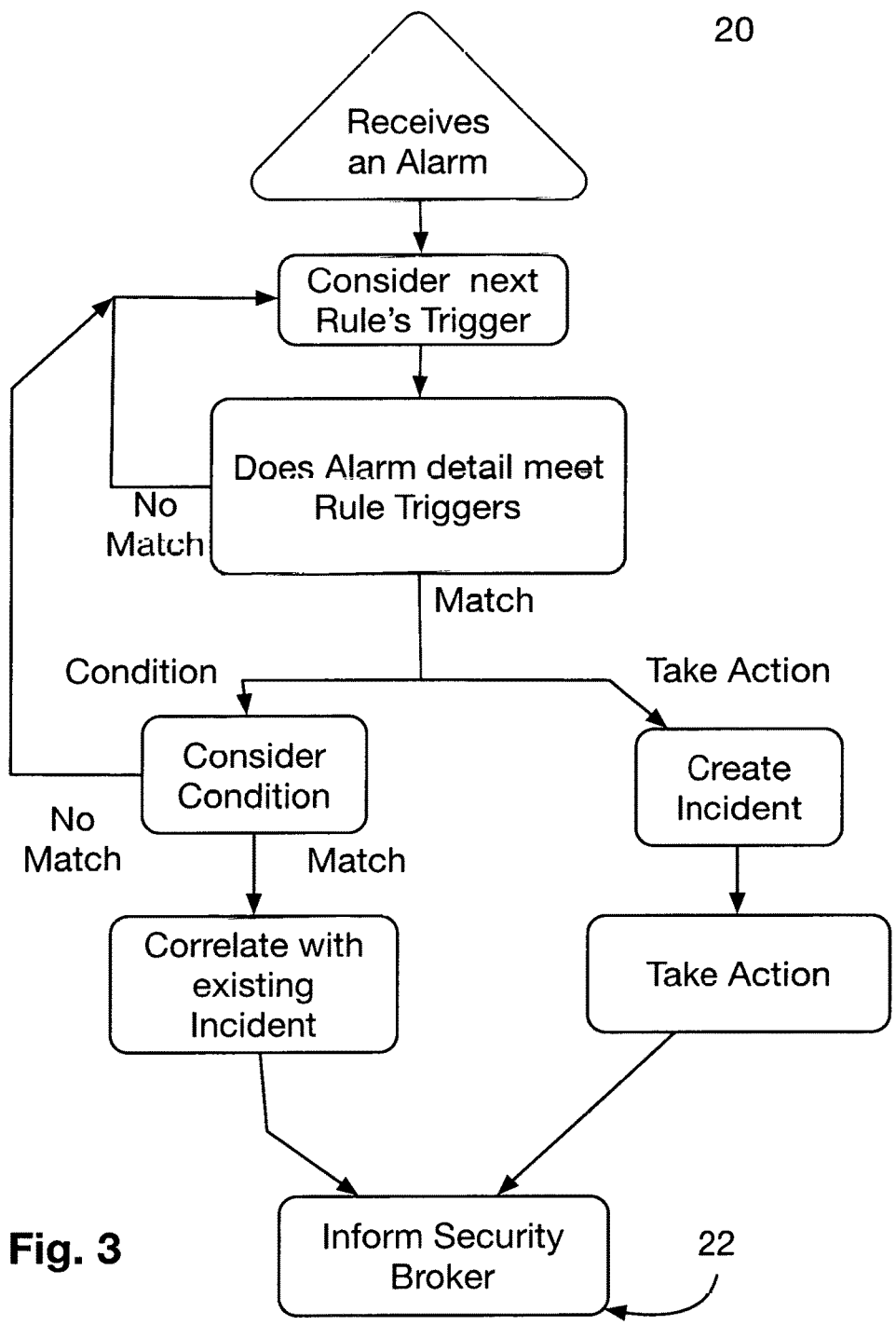

FIG. 3 is a second flow chart of that depicts the operation of an intelligence engine 20. Once the intelligence engine 20 receives an alarm, the engine 20 analyzes the alarm under the terms of predetermined rule triggers. If the engine 20 determines that action must be taken, the security broker 22 is informed and the action is taken.

Figure 4:
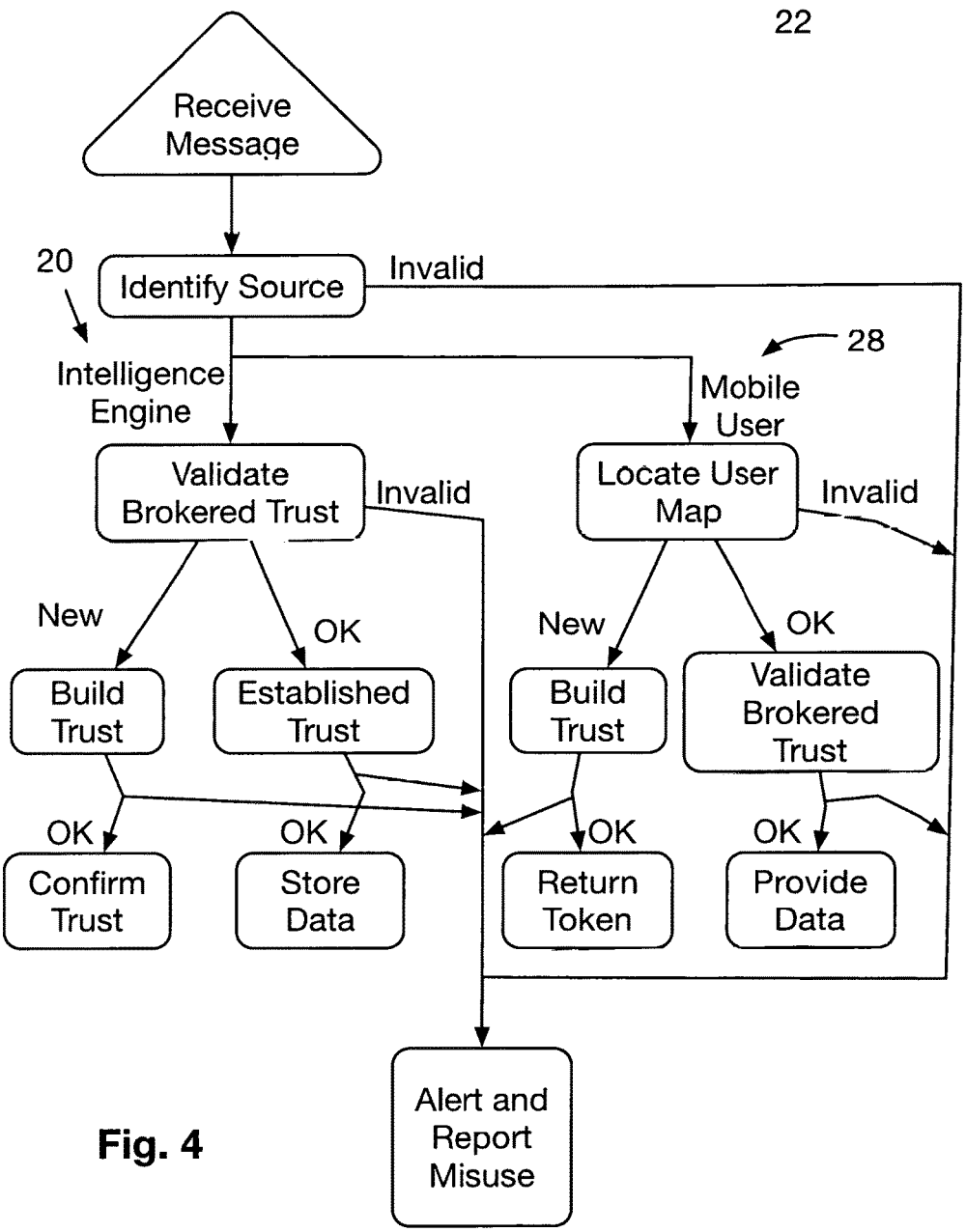

FIG. 4 offers a third flow chart of that presents a view of the operation of the 15 security broker 22. Once the security broker 22 receives a message from the intelligence engine 20, the brokered trust that secures the link to the mobile user 28 is assayed. The trust may be restored, or the security broker generates an alert, reports misuse of the system.

IV. A Specially Designed App

In one embodiment of the invention, a mobile App 32 is downloaded to a user's smartphone 30. This App is a custom module of software which is engineered to perform the specific functions of the present invention. The specific design of the App 32 produces benefits to users 28 that are unavailable without the App 32.

Figure 5:
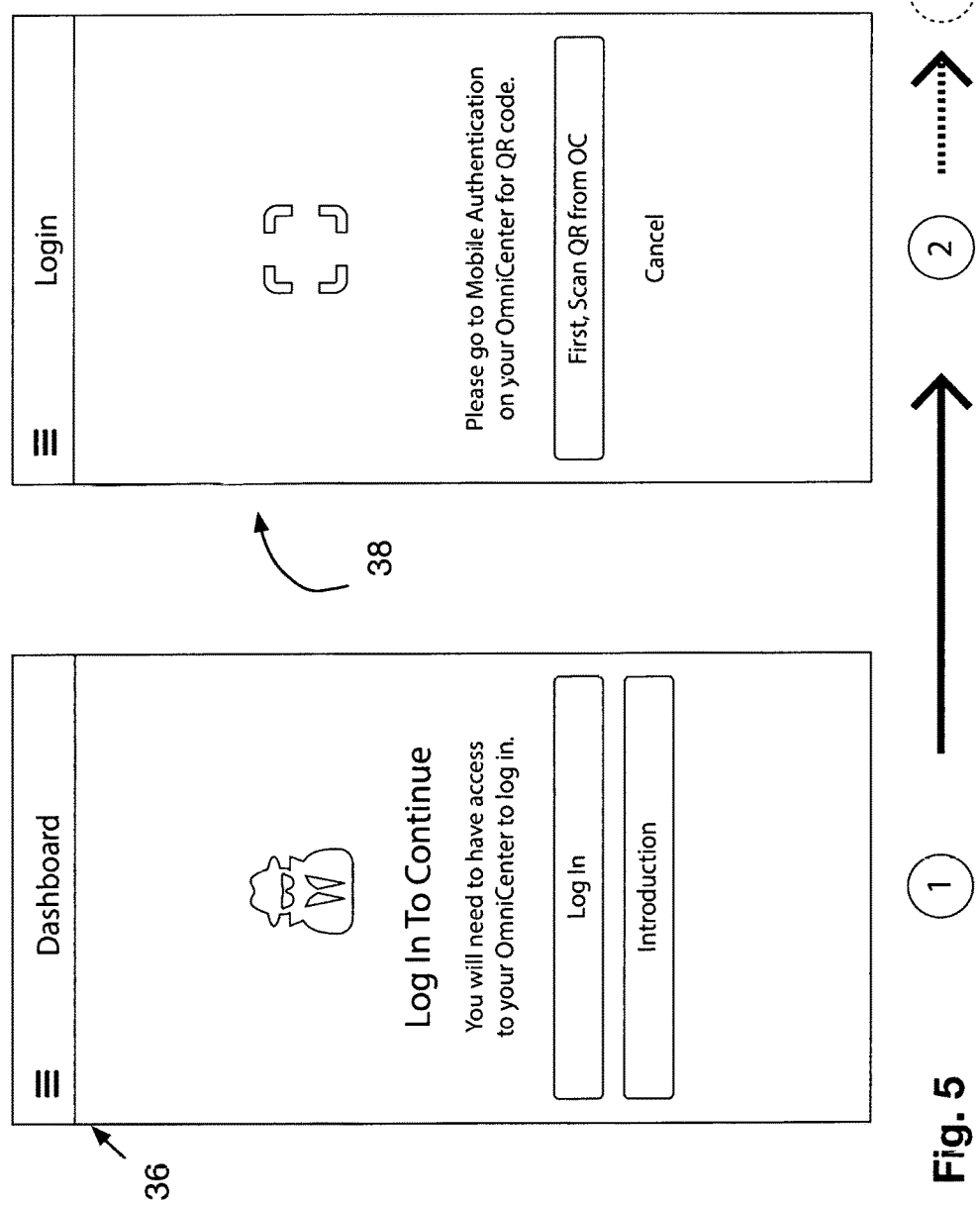

FIG. 5 shows a first "log in" screen 36, which is followed by a login screen 38 that displays a request that the user proceed to the mobile authentication page.

Figure 6:
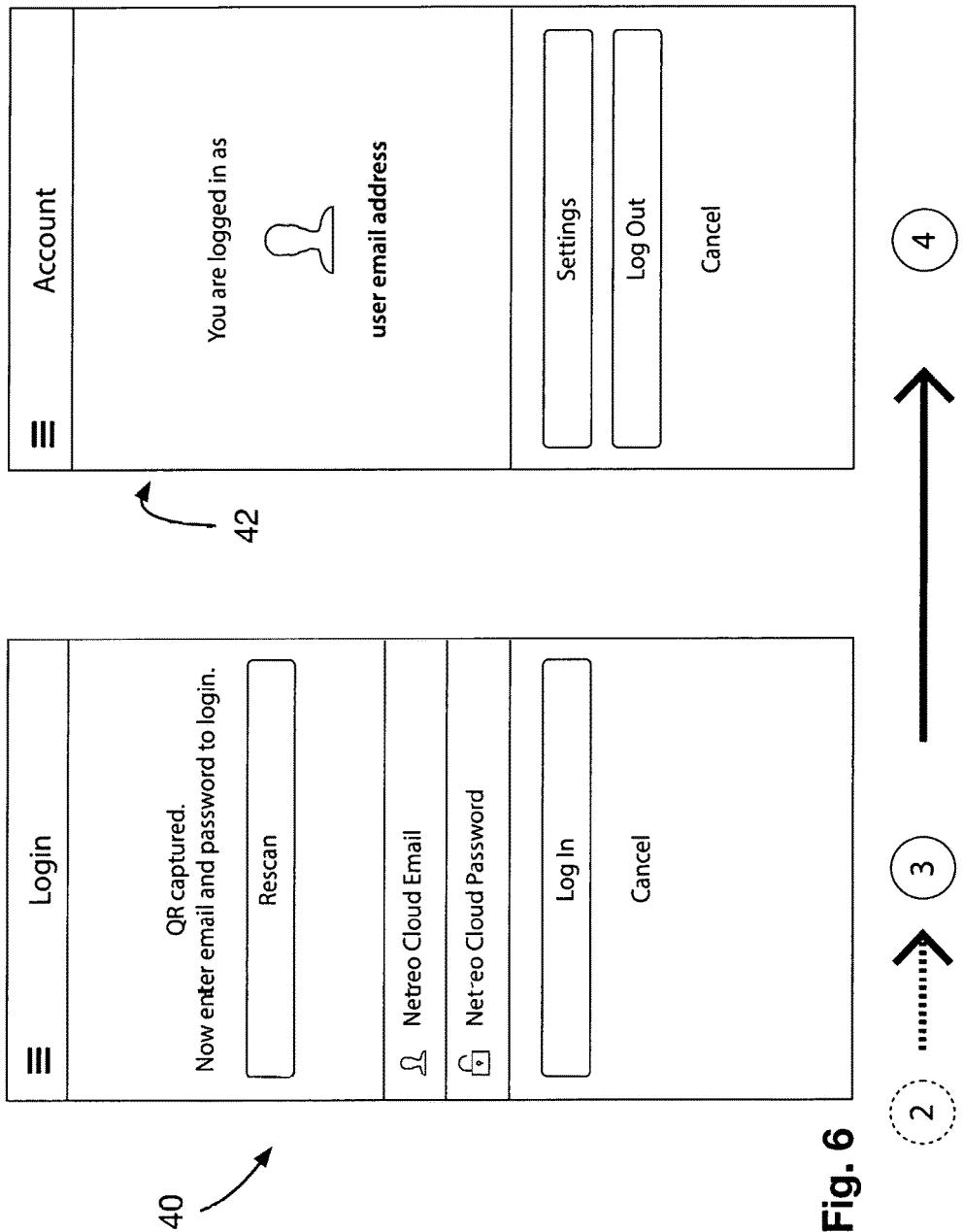

In FIG. 6, the user enters an e-mail address and a password on a second login screen 40; and then sees an "Account" screen 42 that shows that he or she has successfully logged in.

Figure 7:
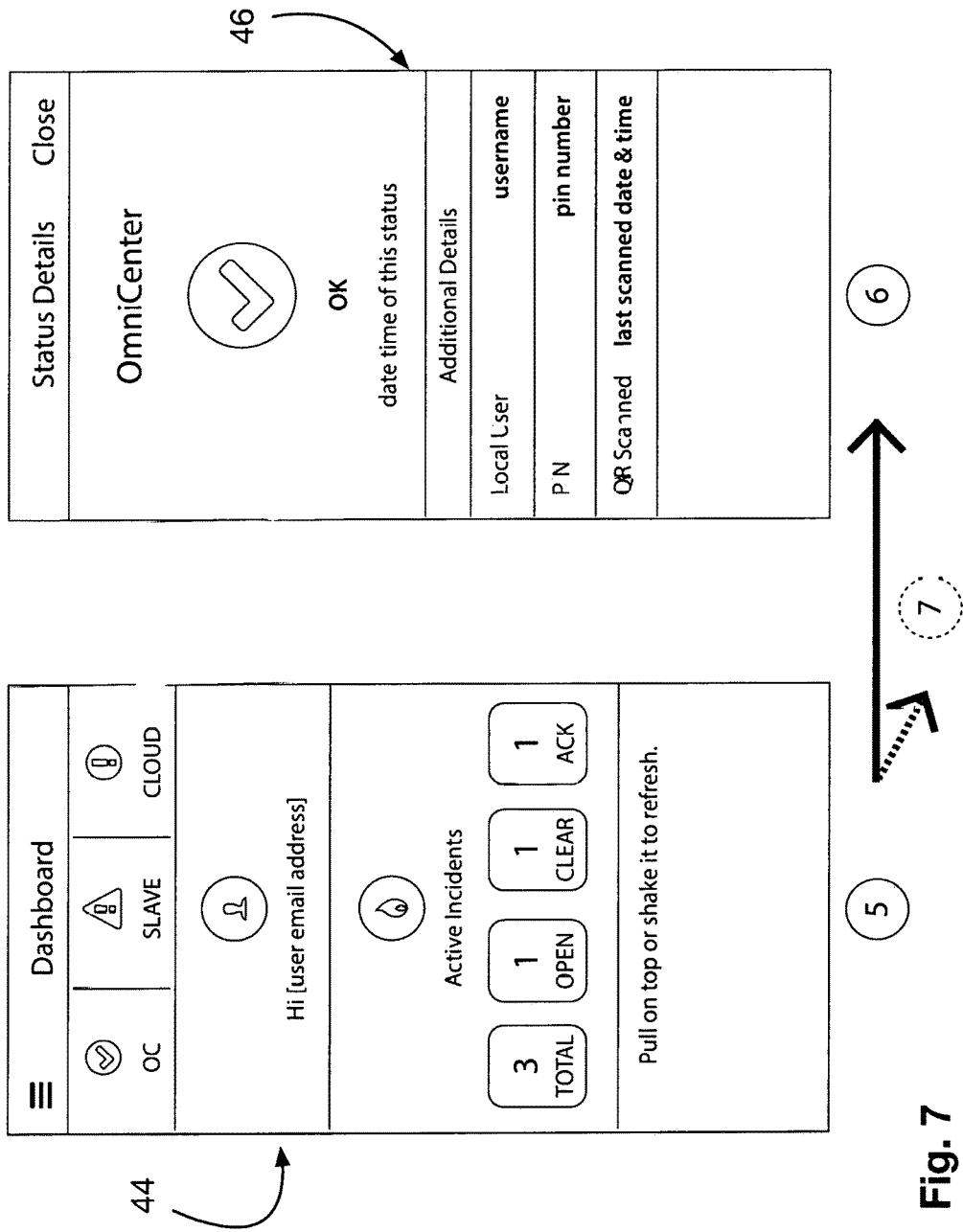

FIG. 7 is a "dashboard" screen 44 that provides buttons to inquire about active incidents; and an "OmniCenter" screen 46 that supplies details on the current status of the secure customer network 12.

Figure 8:
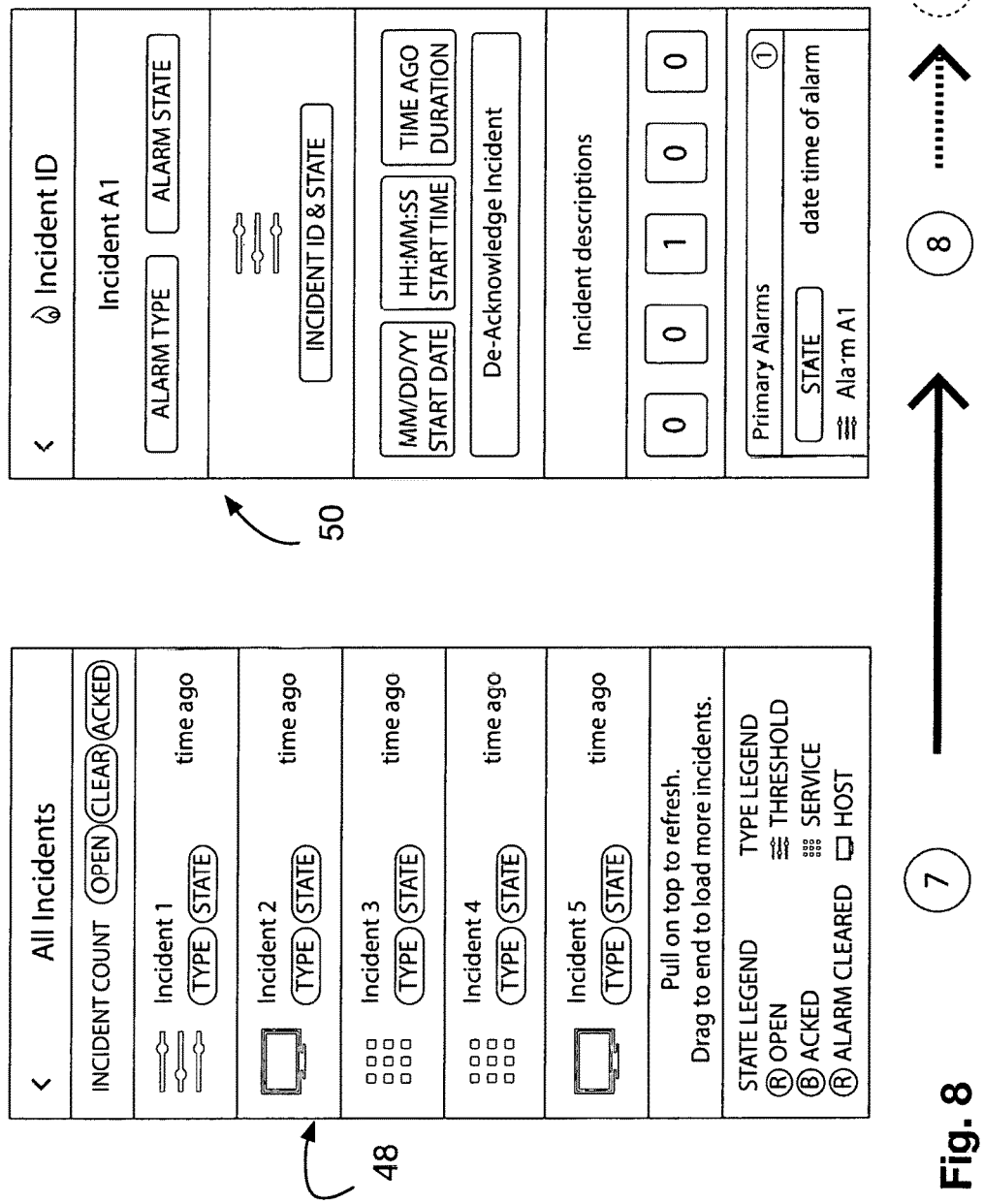

FIG. 8 furnishes views of an "All Active Incidents" screen 48 and a first "Incident ID" screen 50 which supplies details concerning reported incidents.

Figure 9:
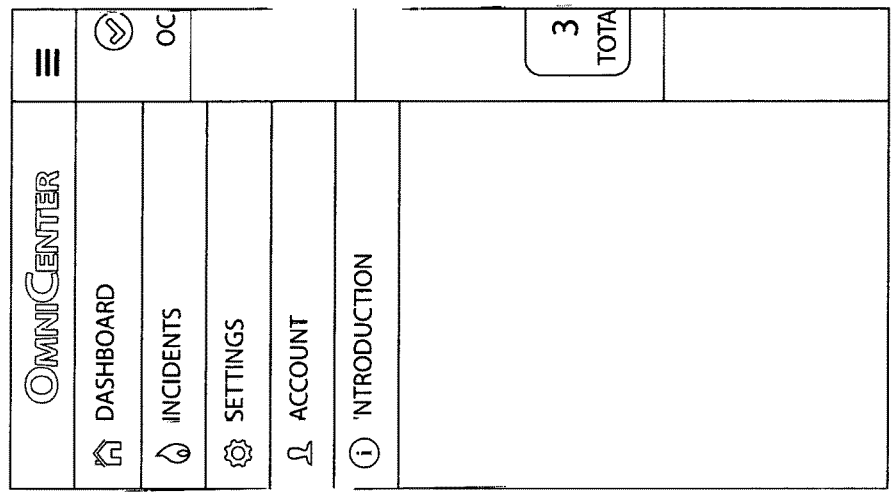
Figure 9:
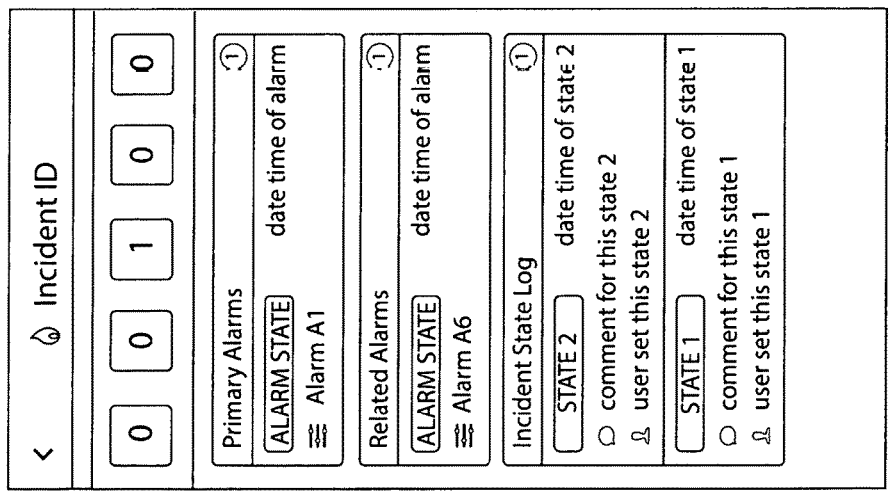
Figure 10:
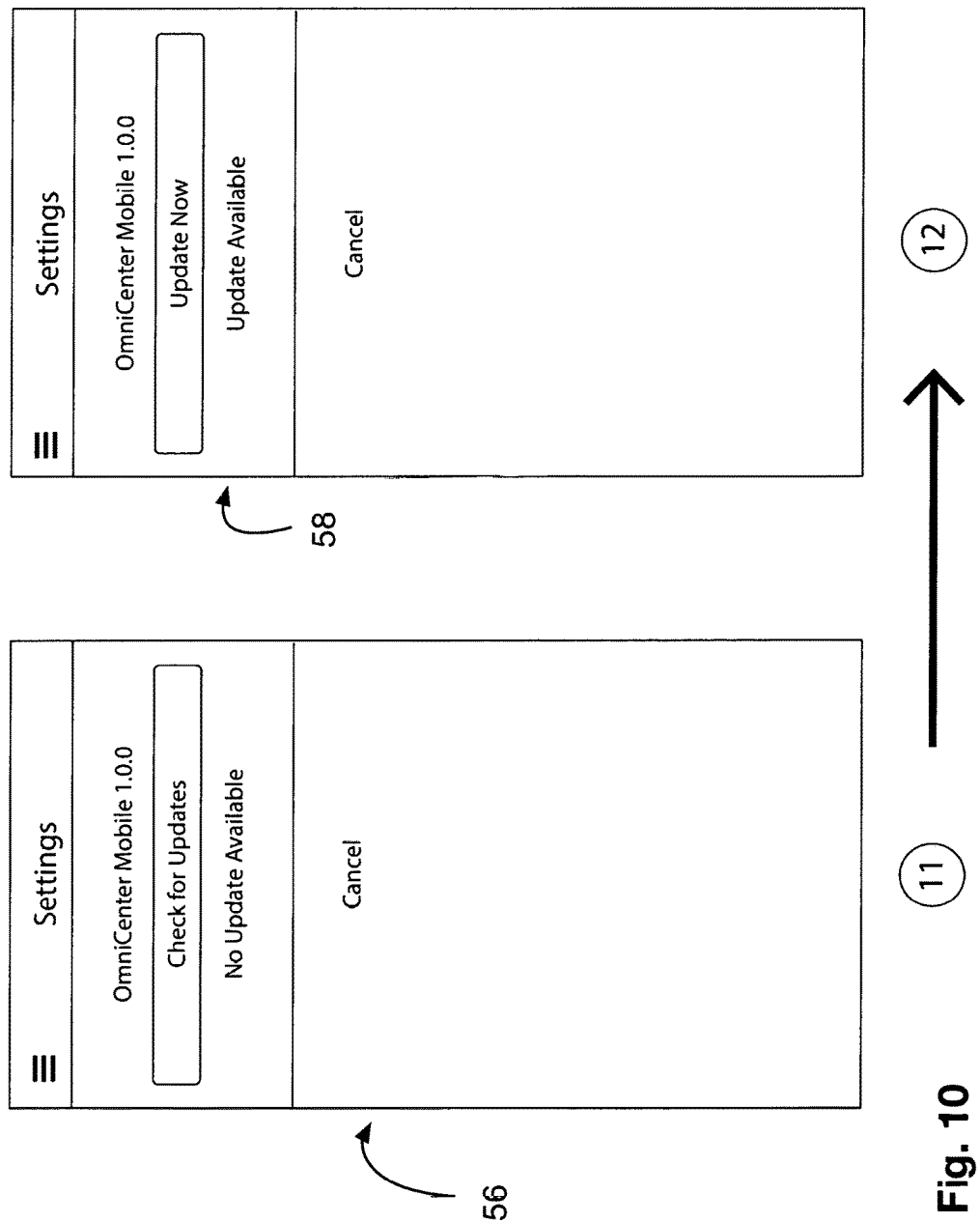

FIG. 9 is a second Incident ID screen 52, while FIG. 10 depicts a second OmniCenter screen 54. The OmniCenter screen 54 provides a menu of information selections for the user.

FIG. 10 illustrates first and second "Settings" screens 56 and 58.

Figure 11:
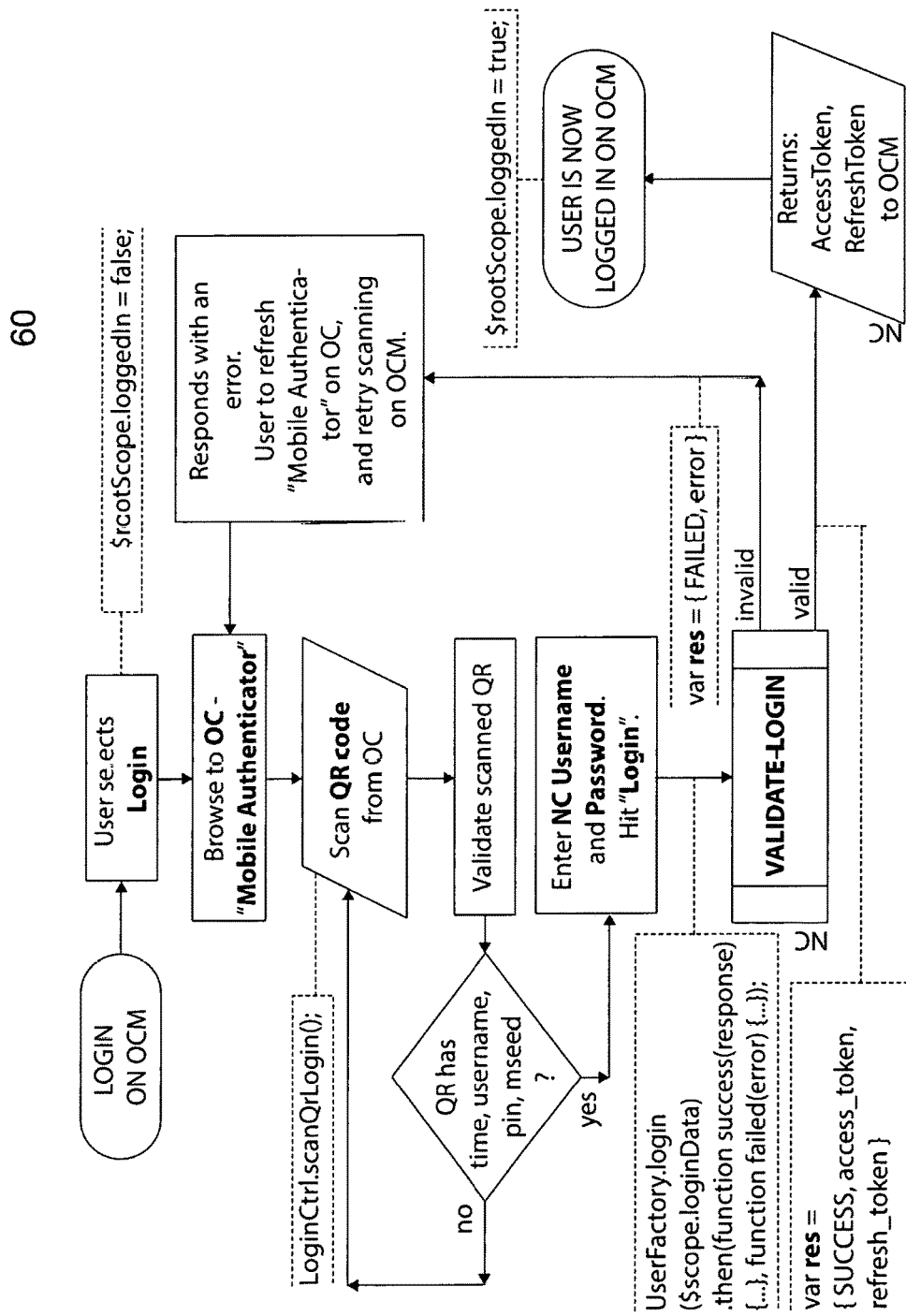
FIG. 11 is a first mobile App logic flow chart.
Figure 12:
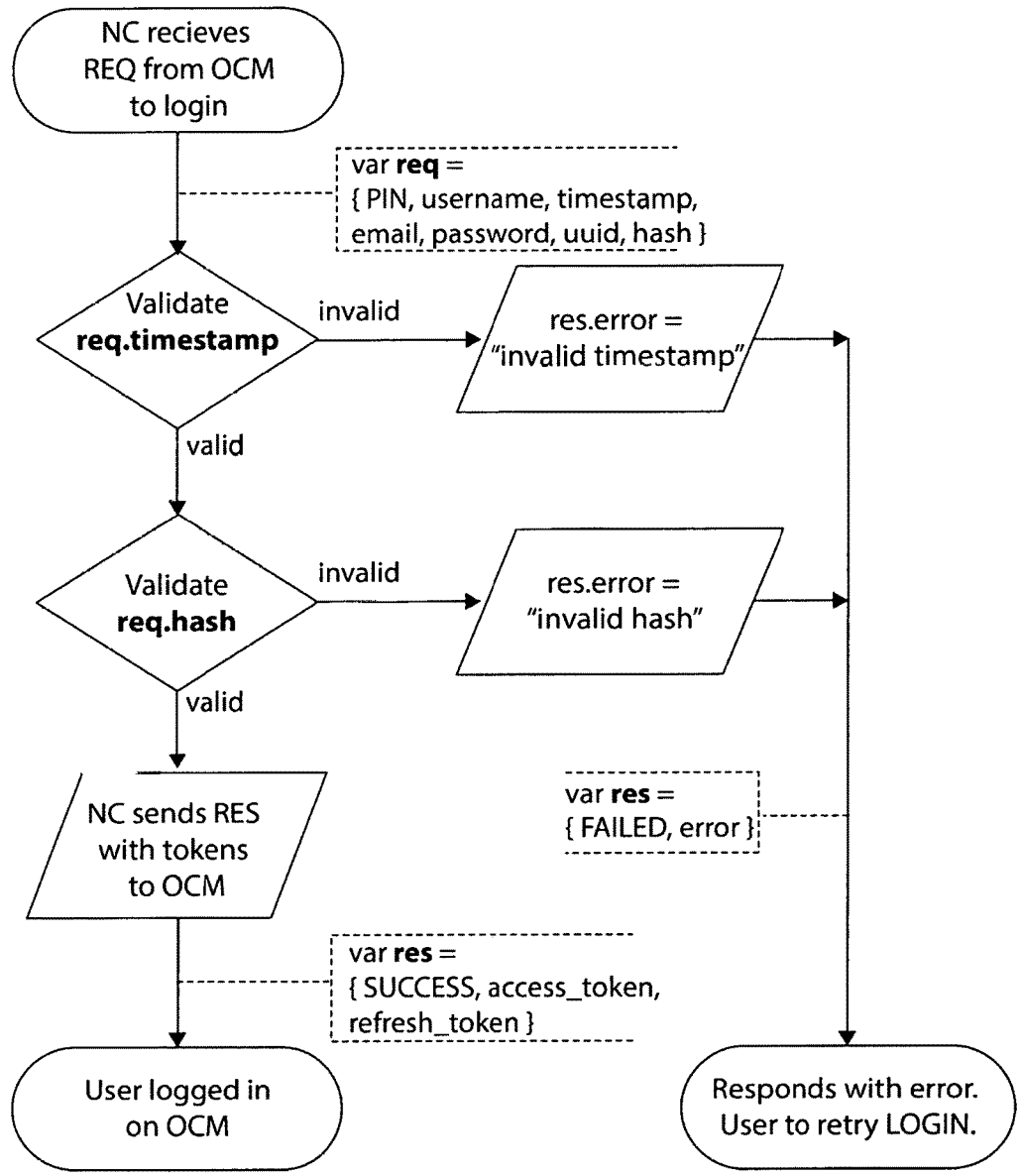
FIG. 12 is a second mobile App logic flow chart.
Figure 13:
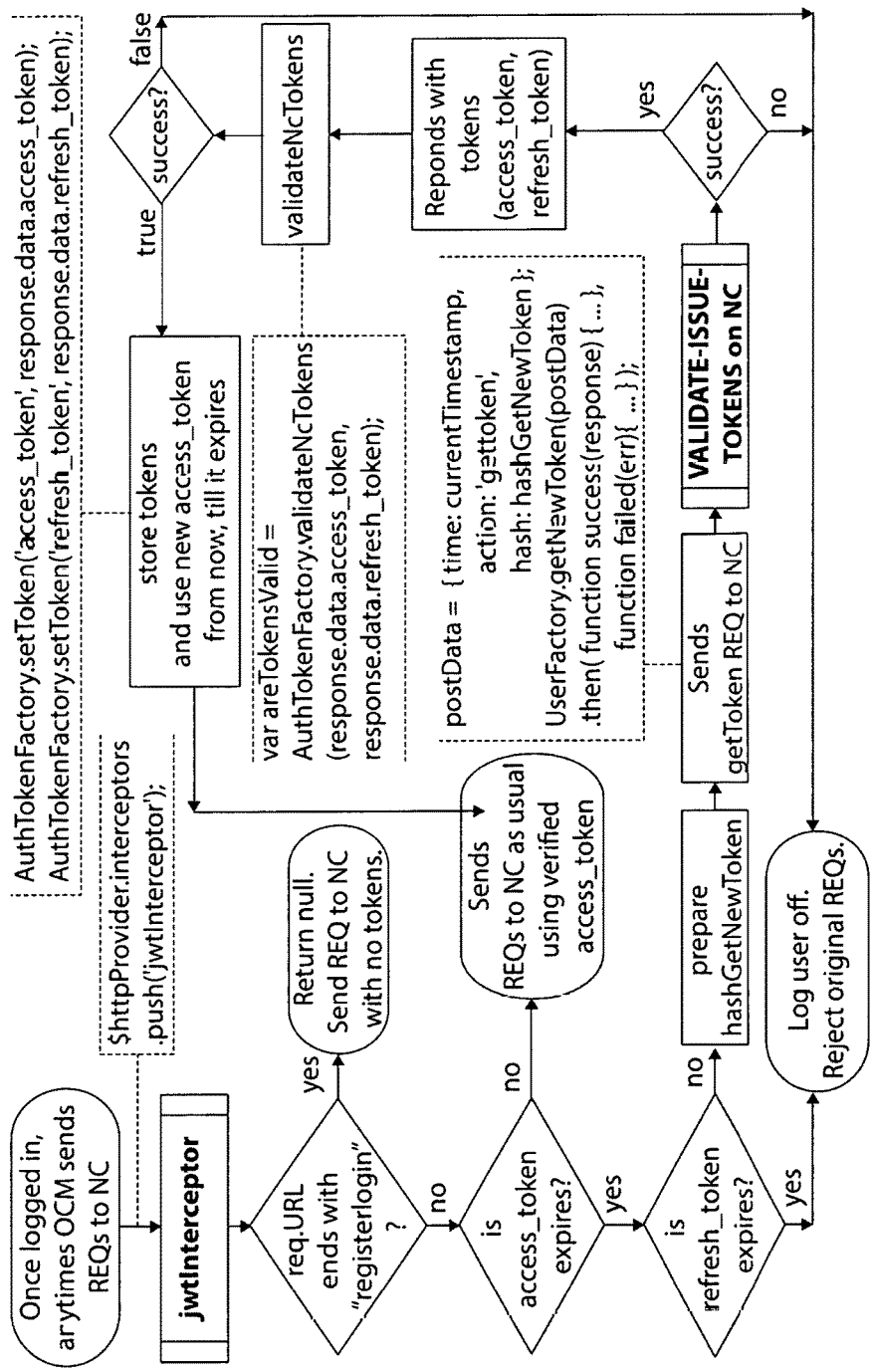
FIG. 13 is a third mobile App logic flow chart.

FIGS. 11, 12 and 13 are flowcharts 60, 62 and 64 which illustrate the App logic flow chart.

V. Additional Features of the Invention

FIG. 14 offers a schematic view 66 that shows how the intelligence engine 20 establishes identity with a security broker 22.

FIG. 15 is a depiction 68 that shows how the network monitor 18 collects information about the secure customer network 12.

FIG. 16 supplies a view 70 that depicts intelligence monitor 20 heartbeats.

FIG. 17 is a depiction 72 that reveals how a mobile device 30 running the App 32 requests an access pairing with an intelligence engine 20 while the user 28 is within the security perimeter 13 of the secure customer network 12.

FIG. 18 reveals a view 74 that shows how the mobile App 32 registers with a security broker 22.

FIG. 19 is a view 76 which portrays the method used by the mobile App 32 to obtain a secure identity to insure a secure environment status.

FIG. 20 is an illustration 78 that depicts the discovery of a problem by the network monitor 18, a report to the intelligence engine 20, and a message to the security broker 22.

FIG. 21 offers a view 80 of how the intelligence engine 20 learns of a problem, and then updates then security broker 22.

FIG. 22 provides a view 82 that shows how a mobile user 28 learns about an outage.

FIG. 23 is a diagram 84 that depicts how the intelligence engine 20 and the security broker 22 share secrets. FIG. 23 illustrates the technical logic flow of how an intelligence engine 20 registers itself with a security broker 22, and receives a secure identity 33.

FIG. 24 is an illustration 86 that portrays the intelligence engine 20 and security broker 22 packet format standard. FIG. 24 offers a view of the technical specification for the packet formats used in FIG. 23. This specification defines the packet structure, and the logic that is used to process and ensure the secure identity 33.

FIG. 25 provides a view 88 that explains how the intelligence engine 20 and the security broker 22 establish and maintain trust.

FIG. 26 offers a view 90 of intelligence engine 20 and security broker 22 data updates. FIG. 26 illustrates the technical specification for the communication process exchanging active incident data between the intelligence engine 20 and the security broker 22.

FIG. 27 is an illustration 92 which shows how the mobile App 32 registers with the intelligence engine 20. FIG. 27 offers details of the technical specification for the three way sharing of identities to prepare a mobile App's secure identity. The intelligence engine 20 shares the following data with the mobile App (while confirming physical security by doing it over a camera and QR code):

1. PIN of intelligence engine
2. A permitted username on the intelligence engine
3. A current timestamp
4. A secret key specific to the username on the intelligence engine The intelligence engine 20 shares the same data set with the security broker 22. After this exchange, the secret keys should never be repeated onto a network call. The security broker 22 can then use this secret key to secure the mobile App's identity without every repeating it to the mobile App 32.

FIG. 28 is a view 94 that shows how the mobile App 32 registers with the security broker 22. FIG. 28 supplies the technical specification for the packet exchange between the mobile App 32 and the security broker 22 to establish brokered trust. Once complete, the trust is identified and managed through a set of defined Json Web Tokens described in the IEFT RFC 7519 Proposed Standard (an access token, and a refresh token), which are URL-safe means of representing claims to be transferred between two parties, and a timer that requires the tokens to be refreshed.

FIG. 29 is a depiction 96 of the mobile App 32 receiving data updates. FIG. 29 furnishes the technical specification and packet structure for the exchange of real time status data between the security broker 22 and the mobile App 32.

FIG. 30 is a view 98 of a mobile App 32 token exchange. FIG. 30 shows a refresh token exchange after a token expiry, which ensures a continued trust between a mobile App 32 and the security broker 22.

VI. Glossary

App
An aggregation, listing or module of software, code or instructions that may be downloaded to or installed on a mobile device, computer or other information appliance.
App Server
A device, which may include a combination of hardware and/or software, which is used to store and to transmit an App to a user or to another device.
Computing Resources
A combination of devices, including hardware and/or software, that are connected together in a network.
Intelligence Engine
A device, which includes a combination of hardware and/or software, which receives alarms from a secured customer network monitor specific to failures or performance issues and any given computing resource in a secure customer network. The intelligence engine processes inputs from the secured customer network monitor, and then organizes, co-relates, and initiates appropriate actions. Any action that is being taken on an incoming alarm creates an open incident. Open incidents are alarm containers that the intelligence engine has deemed as being actionable (and has taken action on), but which are not yet remedied.
Json Web Tokens
Tokens described in the IEFT RFC 7519 Proposed Standard (an access token, and a refresh token), which are URL-safe means of representing claims to be transferred between two parties, and a timer that requires the tokens to be refreshed.
Mobile Device
A generally miniaturized communication, data and/or information appliance which is capable of conveying information to or from a remote destination, such as, but not limited to a network, a computer, a server, a blade, a cellular telephone, a pager, or another mobile device.
Network
A combination of devices and connections, including wired and wireless links, for conveying information, data or other intelligence.
Secure Identity
A portion of information, data, signal, or intelligence that is shared between a mobile device or computer, and a server that is used to uniquely identify the mobile device or computer, and that they can each use to guarantee they are communicating with each other (and not an imposter). The mobile device or computer runs a specially designed and customized App that is associated with the secure identity, which is generally negotiated with a security broker through the wireless network.
Secured Customer Network
A combination of devices and connections, including hardware and/or software, that is operated by a customer and is secured by hardware and/or software to prevent unauthorized access.
Secured Customer Network Monitor
A device, which may include a combination of hardware and/or software, which is installed within the security perimeter of a secured customer network. The secured customer network monitor interrogates some or all of the computing resources on a generally ongoing basis.
Security Broker
A device, which includes a combination of hardware and/or software, for managing and for providing secure identities for: one or more intelligence engines; one or more mobile devices, a mobile device App, and/or one or more users.
Security Primeter
A boundary, limit or firewall which encloses a secured combination of devices, including hardware and/or software.
User
A person or an automated combination of hardware and/or software that may connect to a network using a mobile device, computer or other information appliance.
Wireless Network
An aggregation of hardware, which may include software, that is used to provide links between network nodes or devices without a wired link.

SCOPE OF THE CLAIMS

Although the present invention has been described in detail with reference to one or more preferred embodiments, persons possessing ordinary skill in the art to which this invention pertains will appreciate that various modifications and enhancements may be made without departing from the spirit and scope of the Claims that follow. The various alternatives for providing a Network Monitoring System with Remote Access have been disclosed above are intended to educate the reader about preferred embodiments of the invention, and are not intended to constrain the limits of the invention or the scope of Claims.

LIST OF REFERENCE CHARACTERS

10 Network Monitoring System with Remote Access
12 Secured customer network
13 Secured perimeter
14 Computing resources
16 Internal network
18 Secured customer network monitor
20 Intelligence engine
22 Security broker
24 Connection to external, unsecured network
26 External, unsecured network transmitter and/or receiver
28 User
30 Mobile device
32 Downloaded App
33 Secure identity stored with mobile device
34 App server
36 Log in screen
38 Log in screen
40 Log in screen
42 Account screen
44 Dashboard screen
46 OmniCenter screen
48 All incidents screen
50 First incident ID screen
52 Second incident ID screen
54 OniniCenter screen
56 Settings screen
58 Settings screen
60 Flowchart
62 Flowchart
64 Flowchart
66 Schematic view showing how the intelligence engine establishes identity with a security broker
68 Schematic view that shows how the network monitor collects information about the secure customer network
70 Schematic view depicting intelligence monitor heartbeats
72 Schematic view that reveals how a mobile device running the App requests an access pairing with an intelligence engine while the user is within the security perimeter of the secure customer network 74 Schematic view that shows how the mobile App registers with a security broker 76 Schematic view which portrays the method used by the mobile App to secure identity to insure a secure environment status 78 Illustration that depicts the discovery of a problem by the network monitor, a report to the intelligence engine, and a message to the security broker 80 View that shows how the intelligence engine learns of a problem, and then updates then security broker 82 View that show how a mobile user learns about an outage 84 Diagram that depicts how the intelligence engine and the security broker share secrets 86 Illustration that portrays the intelligence engine and security broker packet format standard 88 View that explains how the intelligence engine and the security broker establish and maintain trust 90 View of intelligence engine and security broker data updates 92 Illustration which shows how the mobile App registers with the intelligence engine 94 View that shows how the mobile App registers with the security broker 96 Depiction of the mobile App receiving data updates 98 View of mobile App token exchange

What is claimed is:

1. An apparatus that permits secure remote monitoring of a computer network by a user on a mobile device not connected directly to the network comprising:
   a) a secure computer network further comprising a plurality of computing resources and a security perimeter that prevents access to the network by unauthorized devices outside the perimeter, wherein all of the computing resources contained within the plurality are contained within the security perimeter;
   b) a secure computer network monitor for obtaining performance data from the plurality of computing resources, wherein the network monitor is located within the security perimeter and is connected to the plurality of computing resources;
   c) an intelligence engine connected to the secure computer network monitor, also located within the security perimeter, wherein the intelligence engine analyzes the performance data and produces one or more reports concerning an operating status of the plurality of computing resources;
   d) a security broker device located outside the security perimeter, wherein:
      i) the security broker device is accessible both to the intelligence engine and to an unsecured wireless device, further comprising a transmitter and receiver;
      ii) the wireless device is located outside the security perimeter; and
      iii) the security broker device insures that only authorized users have access to the intelligence engine;
   e) a specific application program module on the mobile device customized to a secure identity, wherein the module accesses the intelligence engine using the secure identity assigned to the mobile device while located within said security perimeter wherein;
      i) the user invokes the application program module on the mobile device initially to access the intelligence engine while the mobile device is within the security perimeter; and
      ii) after the user is granted initial access to the intelligence engine, the user accesses the security broker device via the wireless network;
      iii) after the user is granted initial access to the intelligence engine, the user is granted subsequent access to the intelligence engine via the security broker device using the secure identity originally assigned to the mobile device within the security perimeter even when the mobile device is no longer located within the security perimeter; and
      iv) the application program module permits the user to request and receive the one or more reports concerning an operating status of the plurality of computing resources via secure encrypted communication using the unsecured wireless device.

2. The apparatus of claim 1, wherein
   a) the secure computer network monitor regularly interrogates the plurality of computing resources; and
   b) said regular interrogation comprises a plurality of ICMP Pings as defined in the IEEE RPC 792 Protocol for measurement of response and readability.

3. The apparatus of claim 1, wherein the secure computer network monitor collects data from the plurality of computing resources, and, if any of the plurality of computing resources returns a negative response, the secure computer network monitor notifies the intelligence engine.

4. The apparatus of claim 1, wherein the secure computer network monitor records a plurality of statistics in a database, and periodically checks the average of the plurality of statistics in the database to see if any values exceed pre-defined thresholds over time.

5. The apparatus of claim 1, wherein the secure computer network monitor detects a threshold anomaly to the intelligence engine if any values exceed the pre-defined thresholds over time.

6. The apparatus of claim 1, wherein the secure computer network monitor tracks the threshold anomaly, and if the threshold anomaly recovers by either starting to offer a positive response, or by a statistic changing its value to below the pre-defined threshold, the secure computer network monitor notifies said intelligence engine of the recovery.

7. The apparatus of claim 1, wherein the intelligence engine receives an alarm from the secure computer network monitor, wherein the received alarm reports a performance issue in one of said plurality of computing resources in said secure customer network.

8. The apparatus of claim 1, wherein the intelligence engine processes the alarm from the secure computer network monitor and creates an open incident.

9. The apparatus of claim 1, wherein:
   a) the security broker acts as a data broker for the intelligence engine, the mobile device, the application program module, and the user; and
   b) said security sharing data among said intelligence engine, mobile device, the application program module, and the user based on a plurality of privileges licensed from the intelligence engine.

10. The apparatus of claim 1, wherein
   a) the security broker generates a secured identity;
   b) the security identity is always paired with a shared secret key; and
   c) the secret key is configured so that it is not shared or communicated after its initial pairing.

11. The apparatus of claim 1, wherein
   a) the user logs into the application program module running on the mobile device;

b) said application program module uses a public network to transmit and receive data to and from the security broker after registering with the security broker.

12. The apparatus of claim 1, wherein the security broker uses the identity of the user, the identity of the mobile device, and the identity of the application program module to determine if they are authorized identities.

13. The apparatus of claim 1, wherein the security broker uses a public network to transmit a current open incident status data to the application program module.

14. The apparatus of claim 1, wherein the application program module provides a reporting interface of the current status of the secure computer network to said user.

15. The apparatus of claim 1, wherein the intelligence engine sends a heartbeat message to the security broker periodically to identify the intelligence engine.

16. The apparatus of claim 15, wherein the security broker interprets the heartbeat message to mean that the intelligence engine is functioning properly, and that its data is up to date.

17. The apparatus of claim 15, wherein the heartbeat is used to maintain trust between the intelligence engine and the security broker, as well as offering a data conduit from the security broker to pass information back to the intelligence engine.

* * * * *